United States Patent
Miller

(10) Patent No.: US 6,544,317 B2
(45) Date of Patent: Apr. 8, 2003

(54) ADVANCED HYBRID PARTICULATE COLLECTOR AND METHOD OF OPERATION

(75) Inventor: Stanley J. Miller, Grand Forks, ND (US)

(73) Assignee: Energy & Environmental Research Center Foundation, Grand Forks, ND (US)

(*) Notice: Subject to any disclaimer, the term of this patent is extended or adjusted under 35 U.S.C. 154(b) by 0 days.

(21) Appl. No.: 09/813,497

(22) Filed: Mar. 21, 2001

(65) Prior Publication Data

US 2002/0134237 A1 Sep. 26, 2002

(51) Int. Cl.$^7$ .............................................. B03C 3/155
(52) U.S. Cl. ..................... 95/63; 55/341.1; 55/341.6; 95/70; 96/55; 96/57; 96/73
(58) Field of Search ................ 96/55, 57, 58, 96/73; 95/63, 69, 70; 55/341.1, 341.6, 372

(56) References Cited

U.S. PATENT DOCUMENTS

| | | | |
|---|---|---|---|
| 2,064,960 A | 12/1936 | Thorne | 183/7 |
| 2,085,349 A | * 6/1937 | Wintermute | 95/69 |
| 2,575,181 A | 11/1951 | Mack | 183/7 |
| 2,593,377 A | * 4/1952 | Wintermute | 95/70 |
| 3,807,144 A | 4/1974 | Graybill | 55/524 X |
| 3,839,185 A | * 10/1974 | Vicard | 55/341.1 X |
| 3,891,528 A | 6/1975 | Griswold | 204/186 |
| 3,910,779 A | * 10/1975 | Penney | 55/341.1 X |
| 3,973,932 A | 8/1976 | Alskog | 96/67 |
| 4,147,522 A | 4/1979 | Gonas et al. | 55/467 X |
| 4,244,710 A | * 1/1981 | Burger | 95/69 |
| 4,354,858 A | * 10/1982 | Kumar et al. | 95/69 X |
| 4,357,151 A | 11/1982 | Helfritch et al. | 55/498 X |
| 4,406,672 A | 9/1983 | Berz | 55/474 X |
| 4,904,283 A | 2/1990 | Hovis et al. | 55/131 |
| 5,024,681 A | 6/1991 | Chang | 110/217 X |
| 5,034,030 A | 7/1991 | Miller et al. | 55/96 |
| 5,158,580 A | 10/1992 | Chang | 55/341.1 X |
| 5,217,511 A | 6/1993 | Plaks et al. | 55/341.1 X |
| 5,403,383 A | * 4/1995 | Jaisinghani | 95/70 X |
| 5,582,632 A | 12/1996 | Nohr et al. | 95/78 |
| 5,647,890 A | * 7/1997 | Yamamoto | 96/57 X |
| 5,837,035 A | 11/1998 | Braun et al. | 95/78 |
| 5,938,818 A | 8/1999 | Miller | 95/63 |
| 6,152,988 A | 11/2000 | Plaks et al. | 95/58 |

FOREIGN PATENT DOCUMENTS

| | | |
|---|---|---|
| DE | 438834 | 12/1926 |
| JP | 55-161339 | 11/1980 |
| WO | WO 9007382 | 7/1990 |
| WO | WO 99/10103 | 3/1999 |

OTHER PUBLICATIONS

"DOE/PC/95258—T1, Advanced Hybrid Particulate Collector", Stanley J. Miller, Distributed by microfiche by the Office of Scientific and Technical Information (OSTI) on Sep. 5, 1996.

* cited by examiner

Primary Examiner—Richard L. Chiesa
(74) Attorney, Agent, or Firm—Johnson & Associates

(57) ABSTRACT

A device and method for controlling particulate air pollutants of the present invention combines filtration and electrostatic collection devices. The invention includes a chamber housing a plurality of rows of filter elements. Between the rows of filter elements are rows of high voltage discharge electrodes. Between the rows of discharge electrodes and the rows of filter elements are grounded perforated plates for creating electrostatic precipitation zones.

54 Claims, 20 Drawing Sheets

ADVANCED HYBRID PARTICULATE COLLECTOR AND METHOD OF OPERATION

The invention was developed with government support under US Department of Energy Contract No. DE-FC26-99FT40719. The government has certain rights in this invention.

FIELD OF THE INVENTION

The present invention relates to the collection of particles. Specifically, though not exclusively, the present invention relates to an apparatus and method to collect particles in a gaseous medium.

BACKGROUND OF THE INVENTION

In facilities such as power plants or factories, the facilities may produce particulate air pollutants which may consist of solid material entrained in a gaseous medium, liquid particles, fine fume-type particles, various types of smoke, nuisance dust, or any type of suspended solid material which is not easily separated from the gaseous medium by gravitational force. Similarly, in industries such as food industries, pharmaceutical industries, or chemical industries may produce very fine powders which must by collected. Such dust may originate from a variety of sources including the combustion or thermal processing of fuels or waste materials, chemical processing, food processing, cement kilns, or powder handling, for example.

One prior art method of reducing the particulate air pollutants involves the use of a conventional pulse-jet baghouse. A typical pulse-jet baghouse includes a number of individual bags or filtration tubes which are four to six inches in diameter, eight to thirty feet long, and are mounted within and suspended from a tube sheet. The particulate dust is collected on the outside surfaces of the bags while the flue gas passes through the bag fabric to the inside, where it exits through the top of the bags into a clean air plenum and subsequently out the stack. Cages are installed inside the bags to prevent them from collapsing during the normal filtration process. To clean the bags, air nozzles are installed above each bag. By applying a quick burst of high pressure air directed inside the bags, the bags are cleaned. This burst of air causes a rapid expansion of the bag and momentarily reverses the direction of gas flow through the bag, which helps to clean the dust off the bags. In a typical prior art baghouse, the bags are oriented in a rectangular array spaced a few inches apart. The bags are usually cleaned with the burst of air one row at a time in sequence, with approximately fifteen bags per row. As a result of the small bag spacing and forward filtration through the two rows of bags adjacent to the row being cleaned, much of the dust that is removed from one row of bags is simply recollected on the adjacent rows of bags. As a result, only the very large agglomerates of dust reach the hopper after supplying the burst of air through the bags. This phenomenon of redisbursion and collection of dust after bag cleaning is a major obstacle to operating prior art baghouses at higher filtration velocities, also known as air-to-cloth (A/C) ratio.

One prior art method of controlling particulate air pollutants is disclosed in U.S. Pat. No. 4,904,283 issued to Hovis et al. on Feb. 27, 1990. This prior art method integrates filtration and electrostatic precipitation in one step. A high voltage electrode is installed in the center of the filter bags, with the grounded electrodes woven into the bags. One major problem with this method is that there is no effective way of transferring the collected dust from the bags to the hopper without reentrainment and recollection.

Another prior art method of controlling particulate air pollutants is disclosed in U.S. Pat. No. 5,217,511 issued to Plaks et al. on Jun. 8, 1993. This method involves the placement of high voltage electrodes between pulse-jet-cleaned bags. Again, a major disadvantage of this method is that there is no effective way to transfer the dust from the bags to the hopper without reentrainment and recollection.

Another prior art method of controlling particulate air pollutants is disclosed in U.S. Pat. Nos. 5,024,681 and 5,158,580 issued to Chang on Jun. 18, 1991 and Oct. 27, 1992. This prior art method uses a high ratio fabric filter installed downstream from an electrostatic precipitator and includes the option of installing a separate precharger section between the precipitator and fabric filter. Again, there is no effective way for removing the dust from the bags without reentrainment and recollection.

Another prior art method of controlling particulate air pollutants is disclosed in U.S. Pat. No. 4,357,151 issued to Helfritch et al. on Nov. 2, 1982. This prior art method discloses a particulate collection method which uses electrostatic collection and filtration combined into the same housing in which high voltage electrodes are spaced between cylindrical perforated grounded surfaces as a filter outer shell and a pleated filter medium inside the cylindrical shell. This method has similar disadvantages.

Another prior art method of controlling particulate air pollutants is disclosed in commonly owned U.S. Pat. No. 5,938,818 issued to Miller on Aug. 17, 1999. Details of the advanced hybrid particulate collector and method of operation are included in the Detailed Description below.

SUMMARY OF THE INVENTION

An apparatus of the invention is provided for a filtration and electrostatic precipitation device for the collection of particulates including a housing, a plurality of rows of filter elements disposed within the housing, a plurality of rows of electrodes disposed between adjacent rows of filter elements, and a plurality of grounded perforated collection plates disposed between adjacent rows of filter elements and electrodes to form electrostatic collections areas between the rows of electrodes and collections plates.

Another embodiment of the invention provides a method of creating an electrostatic collection area in an electrostatic precipitation device comprising the steps of providing a first row of filter elements, providing a second row of filter elements disposed generally parallel to the first row of filter elements, providing a first row of electrodes disposed between the first and second rows of filter elements, providing a first perforated plate between the first row of filter elements and the first row of electrodes, providing a second perforated plate between the second row of filter elements and the first row of electrodes, and applying a voltage differential between the electrodes in the first row of electrodes and the first and second perforated plates to form an electrostatic collection area between the first and second perforated plates.

Another embodiment of the invention provides a filtration and electrostatic precipitation device for the collection of particulates comprising a row of filter elements, one or more electrodes, and a perforated plate disposed between the row of filter elements and the one or more electrodes.

Another embodiment of the invention provides a method of creating an electrostatic collection area and protecting filter elements in a particulate collection device comprising the steps of providing one or more filter elements, providing one or more electrodes, providing an electrically conductive perforated plate, applying a voltage differential between the one or more electrodes and the perforated plate to create an electrostatic precipitation zone, and protecting the one or more filter elements from electrical damage by at least partially surrounding the one or more filter elements by the perforated plate.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The present invention will be described as it applies to its preferred embodiment. It is not intended that the present invention be limited to the described embodiment. It is intended that the invention cover all alternatives, modifications, and equivalencies which may be included within the spirit and scope of the invention.

The following description (along with FIGS. 1–12) includes a description of the advanced hybrid particulate collector disclosed in commonly owned U.S. Pat. No. 5,938,818, which is incorporated by reference herein. The present invention improves on the particulate collector disclosed in the referenced U.S. Patent No. 5,938,818.

Figure 1:
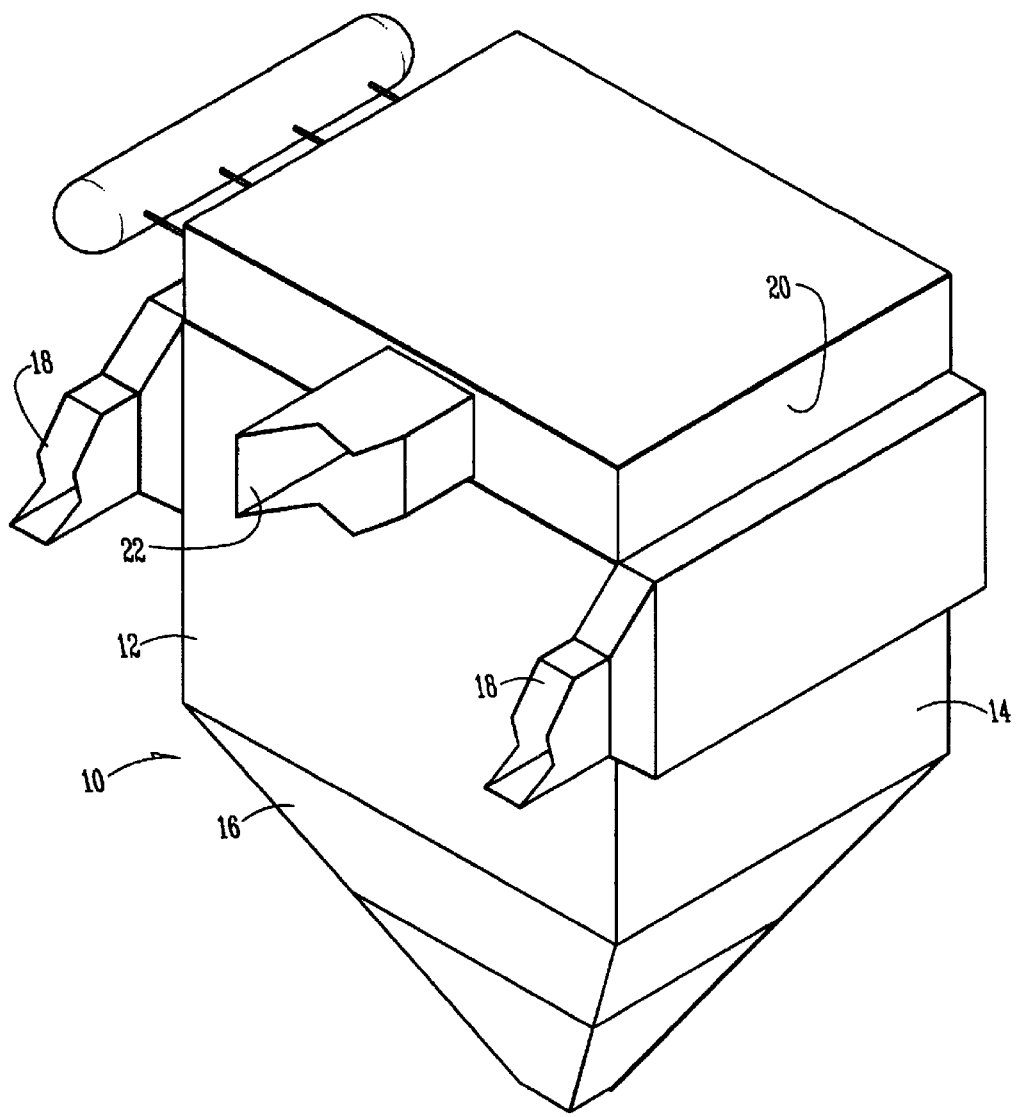
FIG. 1 is a perspective view of a prior art particulate collector.

FIG. 1 shows an advanced hybrid particulate collector (AHPC). An AHPC vessel 10 includes a pair of side walls 12 and a pair of end walls 14 which together form a chamber. Disposed below the side walls 12 and end walls 14 is a hopper 16 which, as is described below, collects particulates. Located on each end wall 14 is an inlet duct 18 which serves as a flue gas inlet or dirty air inlet for the AHPC vessel 10. Located on the upper portion of the AHPC vessel 10 is a clean gas plenum 20 which is connected to outlet ducting 22 which serves as a flue gas outlet. In operation, polluted flue gas is introduced into the AHPC vessel 10 through the inlet ducts 18 and cleaned gas is removed via the outlet ducting 22. The particulate air pollutants removed from the flue gas are eventually collected in the hopper 16.

Figure 2:
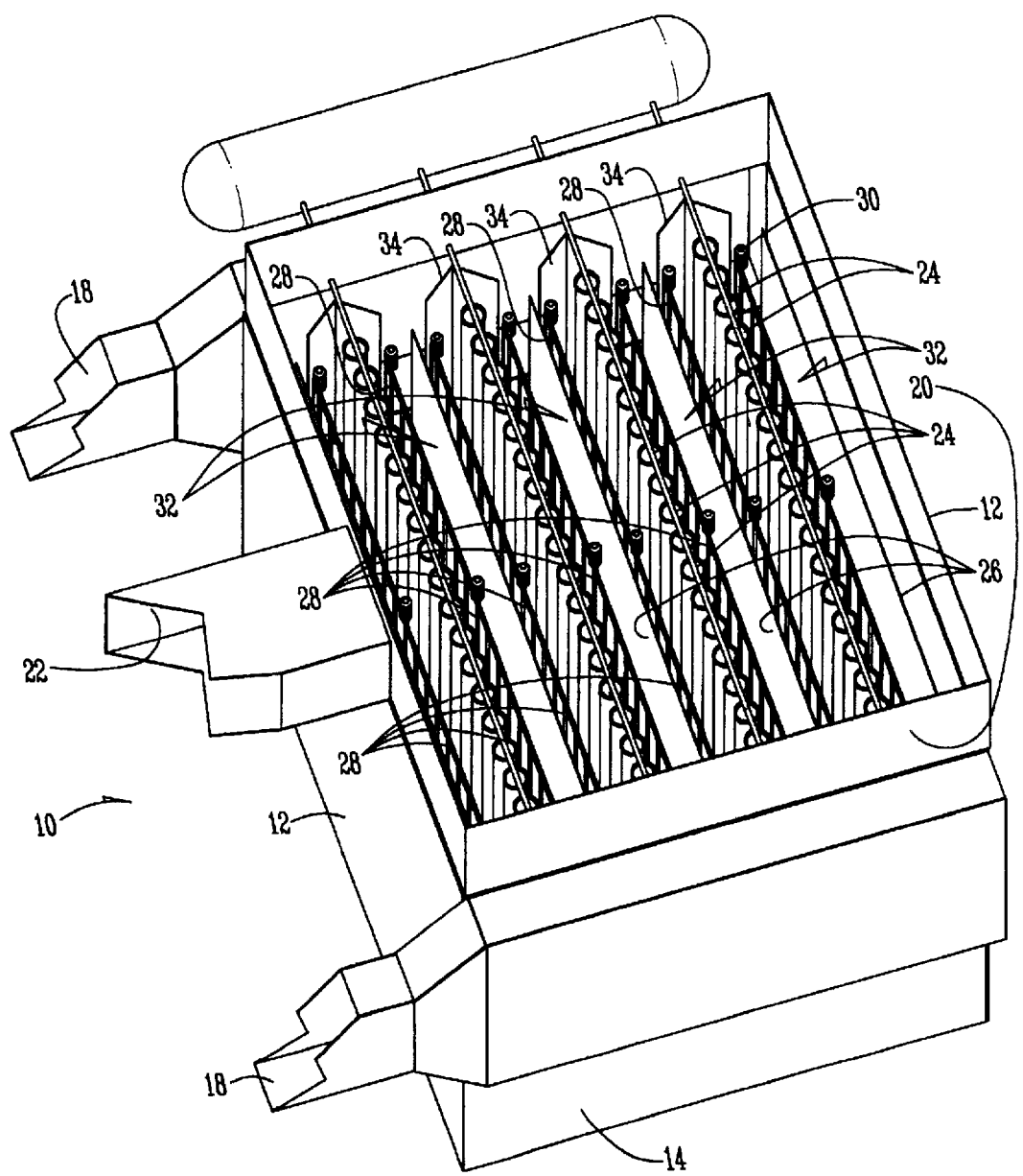
FIG. 2 is a perspective view of the particulate collector shown in FIG. 1 with the top and tube sheet removed to show the interior of the advanced hybrid particulate collector (AHPC) Vessel.

FIG. 2 is a perspective view of the AHPC vessel 10 with the top and bottom surfaces of the clean gas plenum 20 removed to reveal the inside of the chamber. Similarly, FIG. 3 shows the AHPC vessel 10 with the clean gas plenum 20, one of the inlet ducts 18, the outlet duct 22, and one of the side and end walls 12 and 14 removed.

Figure 3:
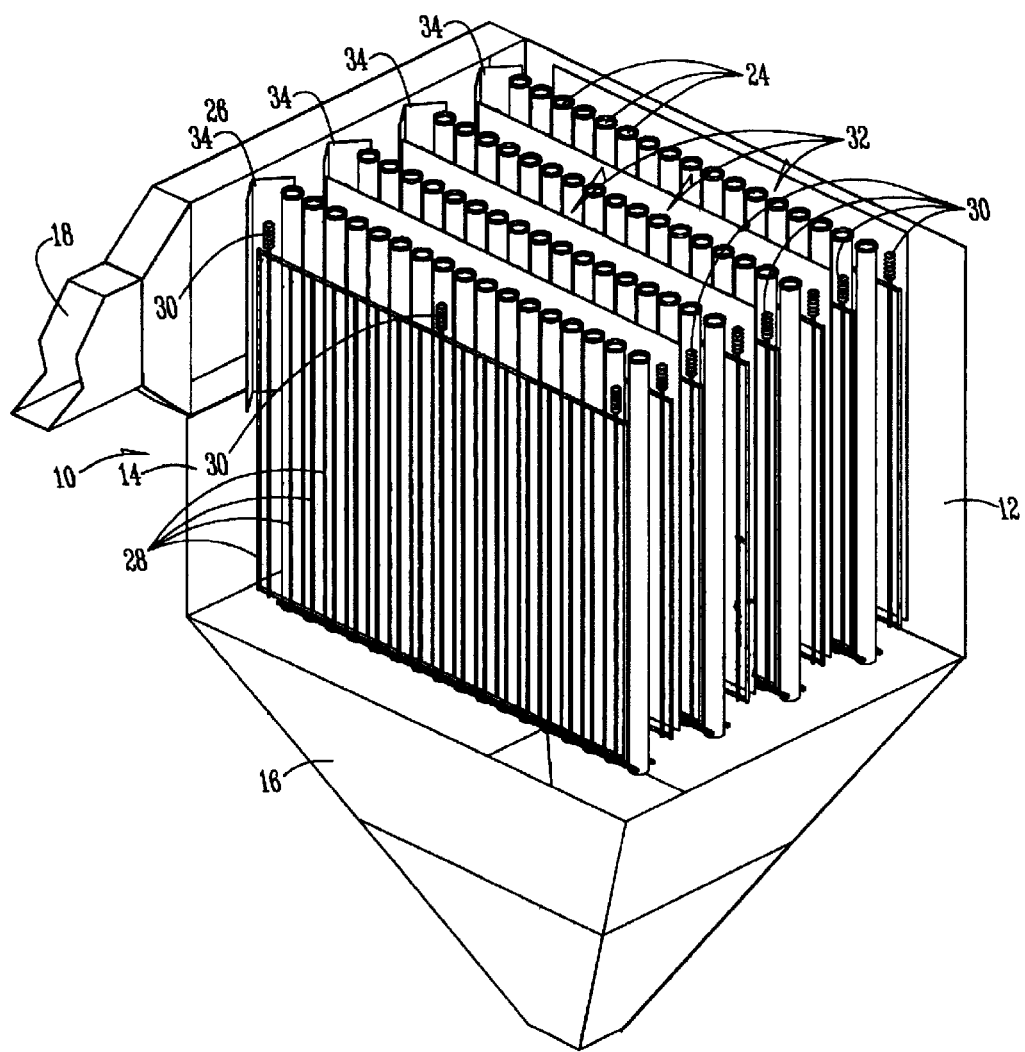
FIG. 3 is a perspective view of the particulate collector shown in FIG. 1 with the top and two sides removed.
Figure 4:
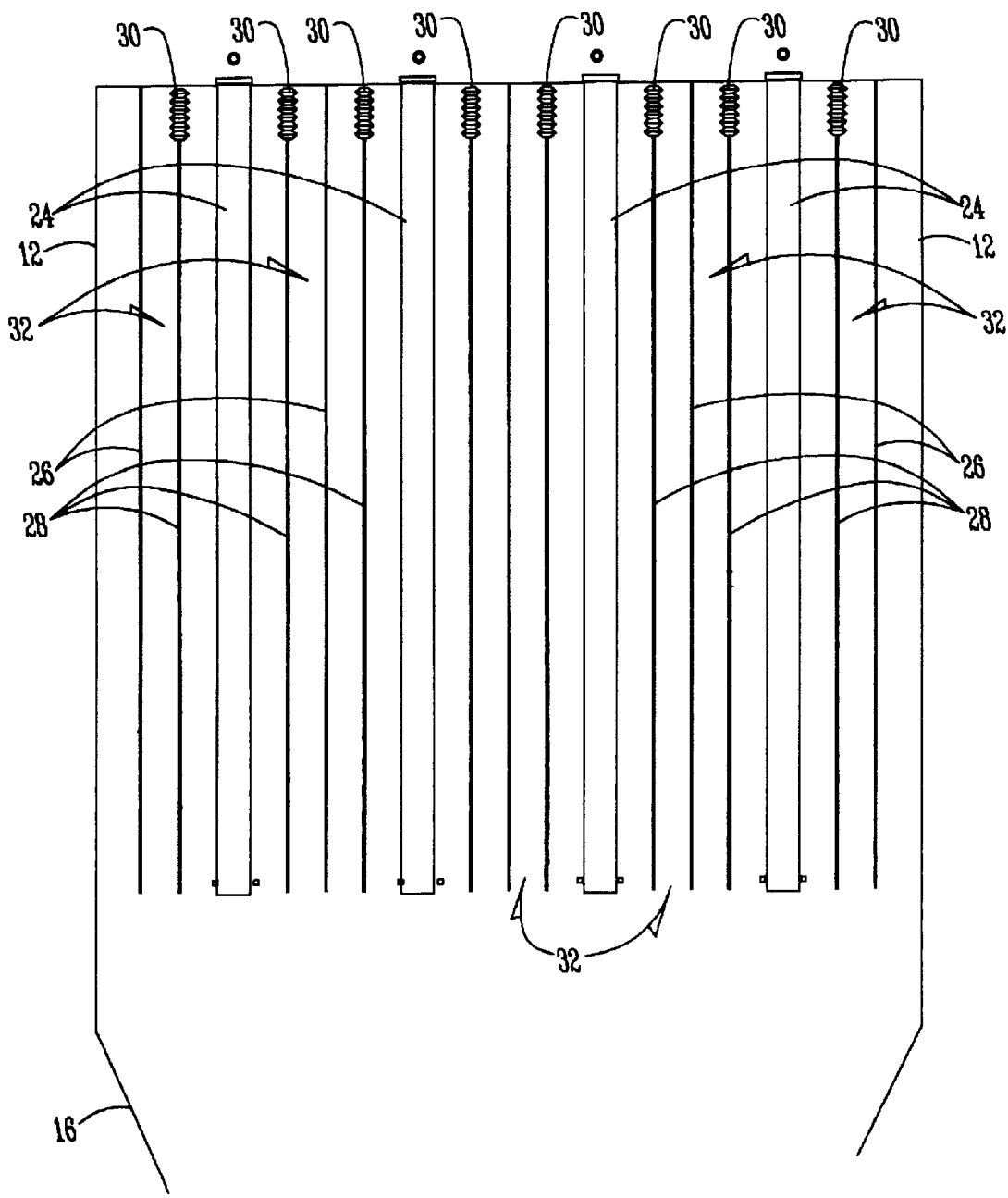
FIG. 4 is a sectional view of the AHPC Vessel shown in FIG. 1.

As shown in FIGS. 2 and 3, a plurality of filter bags 24 are arranged in rows within the AHPC vessel 10. The filter bags 24 are comprised of elongated cylindrical bags disposed around a wire cage (not shown). The upper end of the filter bags 24 are open and are in communication with the clean gas plenum 20 (via a tube sheet). The bags 24 are sealed at their lower ends. The bottom end of the filter bags 24 are closed. When gas is introduced into the AHPC vessel 10 via the inlet ducting 18, the gas flows through the bags 24 into the clean air plenum 20. In this way, the gas introduced into the AHPC vessel 10 must flow through the filter bags 24 before leaving the AHPC vessel 10. In one embodiment, the flow of gases through the AHPC vessel 10 flows at a filtration velocity in the range of 8 to 24 feet per minute.

Between each row of filter bags 24 is a grounded plate 26. Between each row of filter bags 24 and each adjacent grounded plate 26 is an electrode grid 28. Each of the electrode grids 28 is insulated from the AHPC vessel 10 by the insulators 30. Each electrode grid 28, along with its adjacent grounded plate 26, form an electrostatic precipitation (ESP) zone 32. An ESP zone 32 is therefore formed on each side of each row of filter bags 24. In this way, as is described below, when gas containing particulates passes through the ESP zones 32, the particulates are collected on the grounded plates 26. The bags 24, electrode grids 28, and grounded plates 26 are spaced apart such that the electrode grids 28 are closer to the grounded plates 26 than they are to the bags 24. In one embodiment, the distance from each bag 24 to the adjacent electrode grid 28 is in the range of 51% to 80% of the total distance from the bag 24 to the adjacent grounded plate 26. Also shown in FIGS. 2 and 3 are a plurality of baffles 34 which serve to direct the gas from the inlet ducts 18 into the ESP zones 32.

Figure 5:
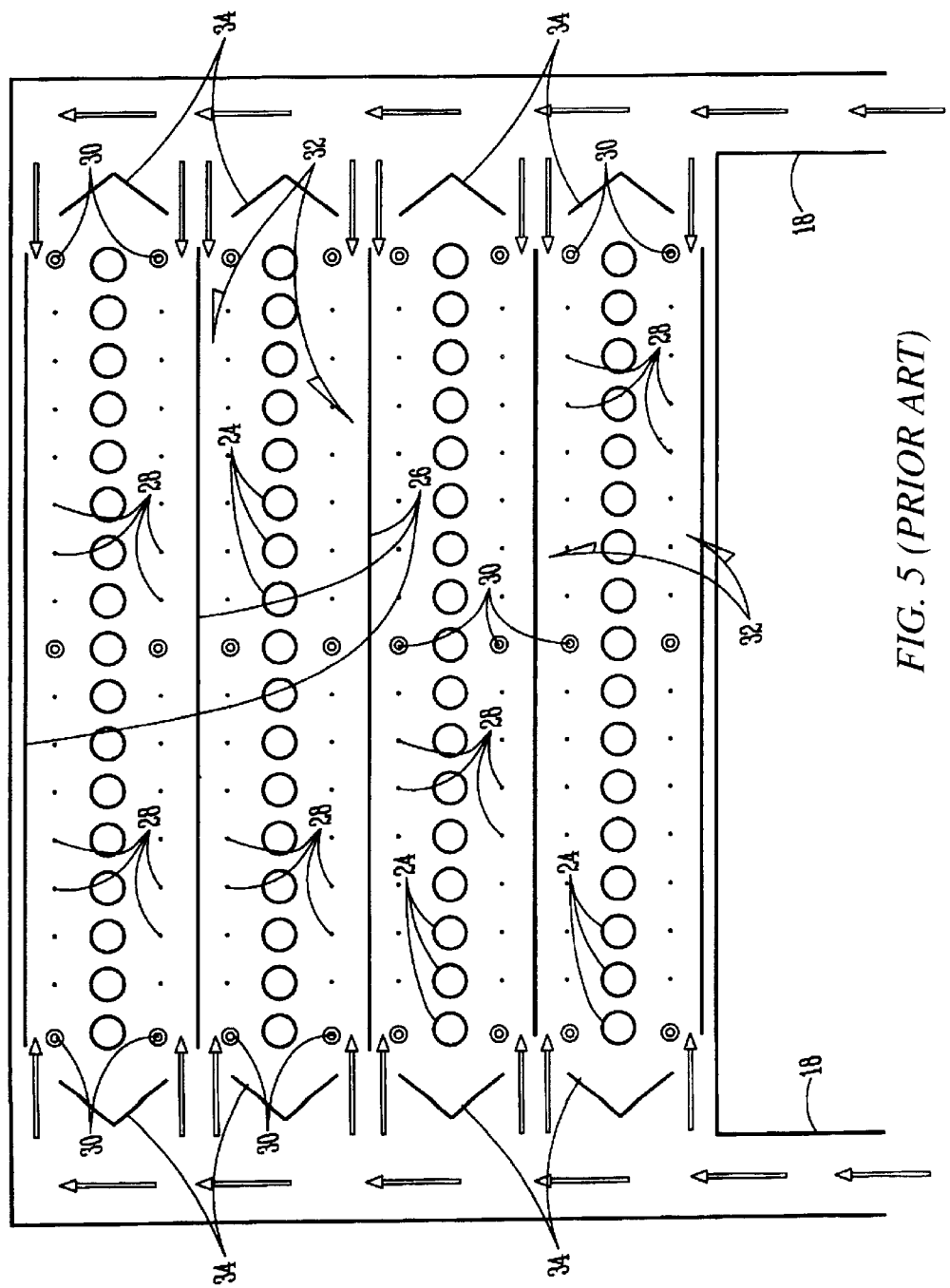
FIG. 5 is a top schematic view of a prior art particulate collector.

FIG. 5 is a top schematic view of the AHPC vessel 10 illustrating the layout of the filter bags 24, the ESP zones 32, and the baffling 34. The arrows shown in FIG. 5 illustrate the direction of the flow of gas through the AHPC vessel 10. As shown, the gas is introduced into the chamber where it is directed into the ESP zones 32 by the baffles 34. The gas then flows through the filter bags 24, into the clean gas plenum 20, and out through the outlet ducting 22 (described below).

Figure 6:
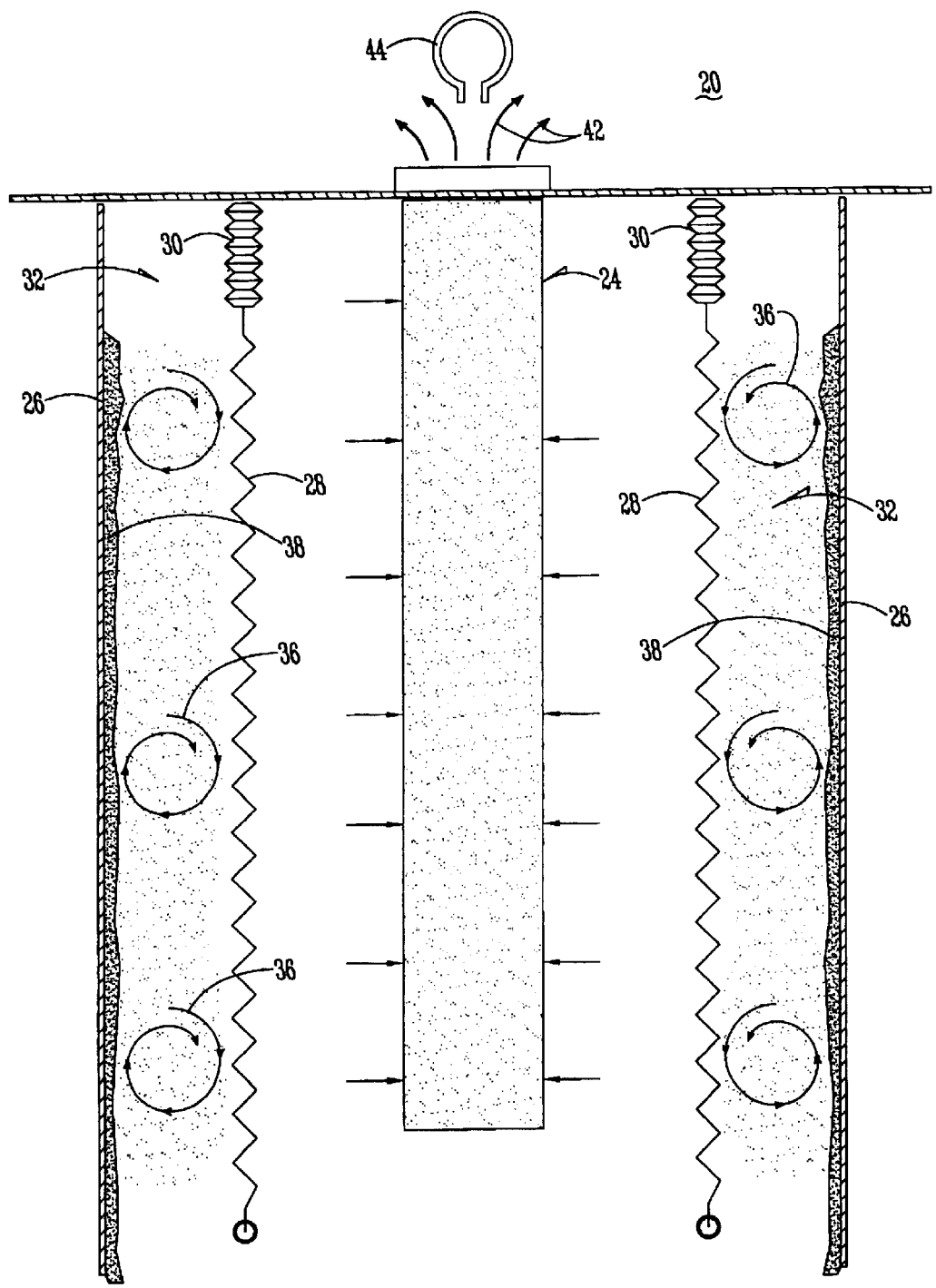
FIGS. 6–8 are sectional views illustrating the operation of a prior art particulate collector.
Figure 7:
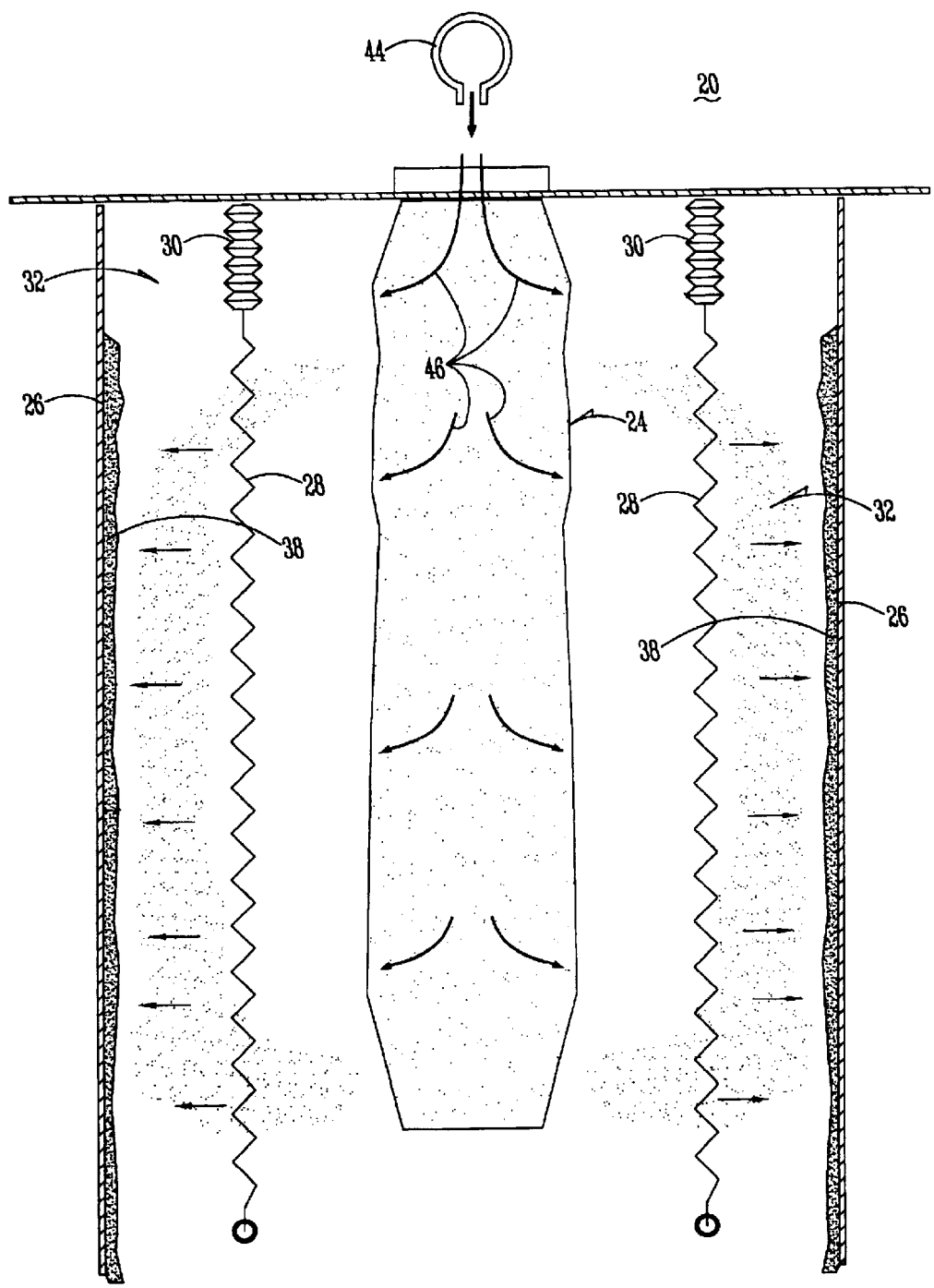
Figure 8:
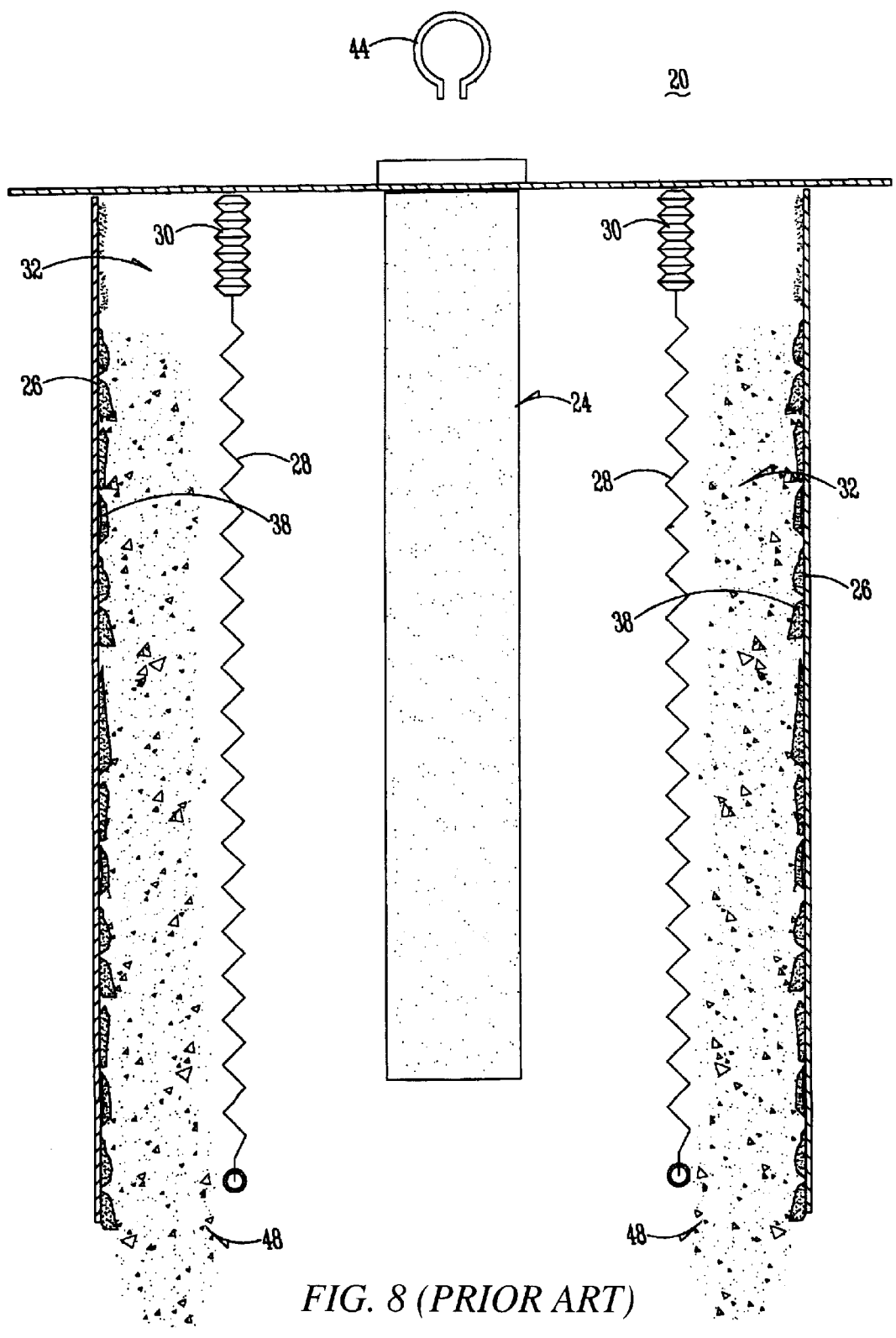

FIGS. 6–8 are enlarged sectional views of one row of filter bags. FIGS. 6–8 illustrate in detail the operation of the particulate collector shown in FIGS. 1–5.

To completely understand the operation of the particulate collector, it is helpful to look at the housing of the AHPC vessel 10 as being divided into five zones which are in continuous fluid contact. Zone 1 is comprised of the inlet ducting and baffling whose purpose is introducing the dirty gas to the collection zones. Zone 2 is the electrostatic collection area and consists of the plurality of high voltage electrodes, or electrode grids 28, and grounded collection plates 26. Zone 3 is the filtration area and consists of the plurality of filter elements, or filter bags 24. Zone 4 is the dust collection hopper 16 located below Zones 2 and 3. Zone 5 is the clean plenum area above Zones 2 and 3 and includes bag cleaning blowback pipes and nozzles 44, a plenum area to access the bags 24, and outlet ducting 22 to pass the cleaned gas to the fan and discharge stack (not shown).

FIG. 6 shows the normal particulate collection mode of the particulate collector. As was mentioned above, dirty gas is introduced into the AHPC vessel 10 by the inlet ducting 18 (Zone 1). The air baffles 34 cause the gas to flow into the ESP zones 32, which are located between the electrode grids 28 and the grounded plates 26 (FIG. 5). The baffles 34 cause the gas to flow in a turbulent manner as is illustrated by the arrows 36. As a result of the electric field produced by the electrode grid 28 and the grounded plates 26, the particulates in the ESP zone immediately become charged and migrate toward the grounded plate 26 at a velocity (migration velocity) dependent upon the particle charge and the electric field strength. Since all of the gas flow must eventually pass from Zone 2 into Zone 3 and through the bags 24, there is a velocity component perpendicular to the plates that passes the wires, or electrode grid 28. Since migration velocity of particles moving toward the plates 26 will be greater than the gas velocity component moving toward the bags 24, most of the particles will collect on the plates 26 rather than be carried past the electrode grid 28 to the bags 24. Under ideal laminar flow conditions, only particles with migration velocities smaller than the gas velocity toward the bags 24 would reach the bags 24 during normal filtration. However, because of some flow maldistribution and the presence of turbulent flow, a small fraction of the dust (less than 10%) might reach the bags 24 during normal collection operation. However, collection of the particles that do reach the filtration surface of the bags 24 is enhanced as a result of the particle charging. Charged particles are more readily collected because there is an additional coulomb force to drive the particles to a grounded or neutral surface. In addition, a dust cake formed from the charged particles will become porous, which produces a lower pressure drop. Ultra high fine-particle collection is achieved by removing over 90% of the dust before it reaches the fabric, precharging the particles, and using appropriate membrane and fabric to collect particles that reach the filtration surface. After flowing through the bags 24, the gas flows upward into the clean air plenum 20 as is illustrated by the arrows 42. As a result, the gas entering the clean air plenum 20 is very clean. The clean gas is then sent to the stack via the outlet ducting 22 (FIG. 1).

FIG. 7 illustrates the bag cleaning process. Since the dust accumulates on the grounded plates 26 and filter bags 24, it must be periodically removed and transferred from Zones 2 and 3 to the hopper 16, or Zone 4. Located above each filter bag 24 is a pulse nozzle 44 which is capable of directing a pulse of air down through the filter bags 24. One row of the bags 24 at a time is cleaned with a reverse pulse of pressurized air or gas from the pulse nozzles 44. The pulse has sufficient energy to dislodge most of the dust from the bags 24. Larger agglomerates fall to the hopper 16 and are transferred directly from Zone 3 to Zone 4. However, much of the dust is reentrained into particles too small to fall directly to the hopper. While these are small particles, they were agglomerated into much larger particles than are originally collected on the bags. As discussed above, in conventional baghouses these particles would immediately recollect on the bags 24. Here, the bags 24 are pulsed with sufficient energy and volume to propel the reentrained dust past the high voltage wires and back into Zone 2, the ESP zone, where they immediately become charged and are trapped on the plates 26. Since these reentrained particles are much larger than those originally collected on the bags, they are trapped in the ESP zone much more easily than the original fine particles.

To improve the cleaning process, the particulate collector may utilize a two-tiered cleaning pulse. A first, high-pressure short-duration pulse is followed by a second, lower-pressure longer duration pulse. In one embodiment, the first pulse is in the range of 15 to 150 psig, with a duration in the range of 0.01 to 0.5 seconds. The second pulse is in the range of 1 to 15 psig, with a duration in the range of 0.5 to 10 seconds. Conversely, the first pulse is in the range of 1 to 15 psig, with a duration in the range of 0.5 to 10 seconds. The second pulse then is in the range of 15 to 150 psig, with a duration in the range of 0.01 to 0.5 seconds. Of course, the particulate collector may use a single pulse, or more than two pulses.

In one embodiment, the plates 26 are cleaned near the end of the bag cleaning process with the electric field shut off for 0.1 to 8 seconds to release the dust from the plates 26. In another embodiment, the polarity of the electric field is reversed during the bag cleaning and plate rapping steps.

The alternative rows of bags 24, electrode grids 28, and plates 26 act as an "electronic curtain" to prevent the reentrained dust from being collected on the same bags 24. The plates 26 prevent the dust from being recollected on adjacent rows of bags 24.

Periodically, the dust layers 38 must be cleaned from the grounded plates 26. FIG. 8 illustrates a plate rapping process which removes the dust and particulates from the grounded plates 26, or transfers the dust from Zone 2 to the hopper 16, or Zone 4. With the high voltage disconnected from the electrode grid 28, the grounded grids 26 are rapped or vibrated to dislodge large agglomerates which then fall in the hopper 16. A fraction of the dust is reentrained as particles too small to reach the hopper 16. Most of the reentrained particles are recollected on the plates 26. Any remaining fine dust, reentrained as a result of rapping, that penetrates the ESP Zone 32 will be collected at an ultrahigh collection efficiency by the filter bags 24. Plate cleaning may also be accomplished without disconnecting the high voltage.

Figure 9:
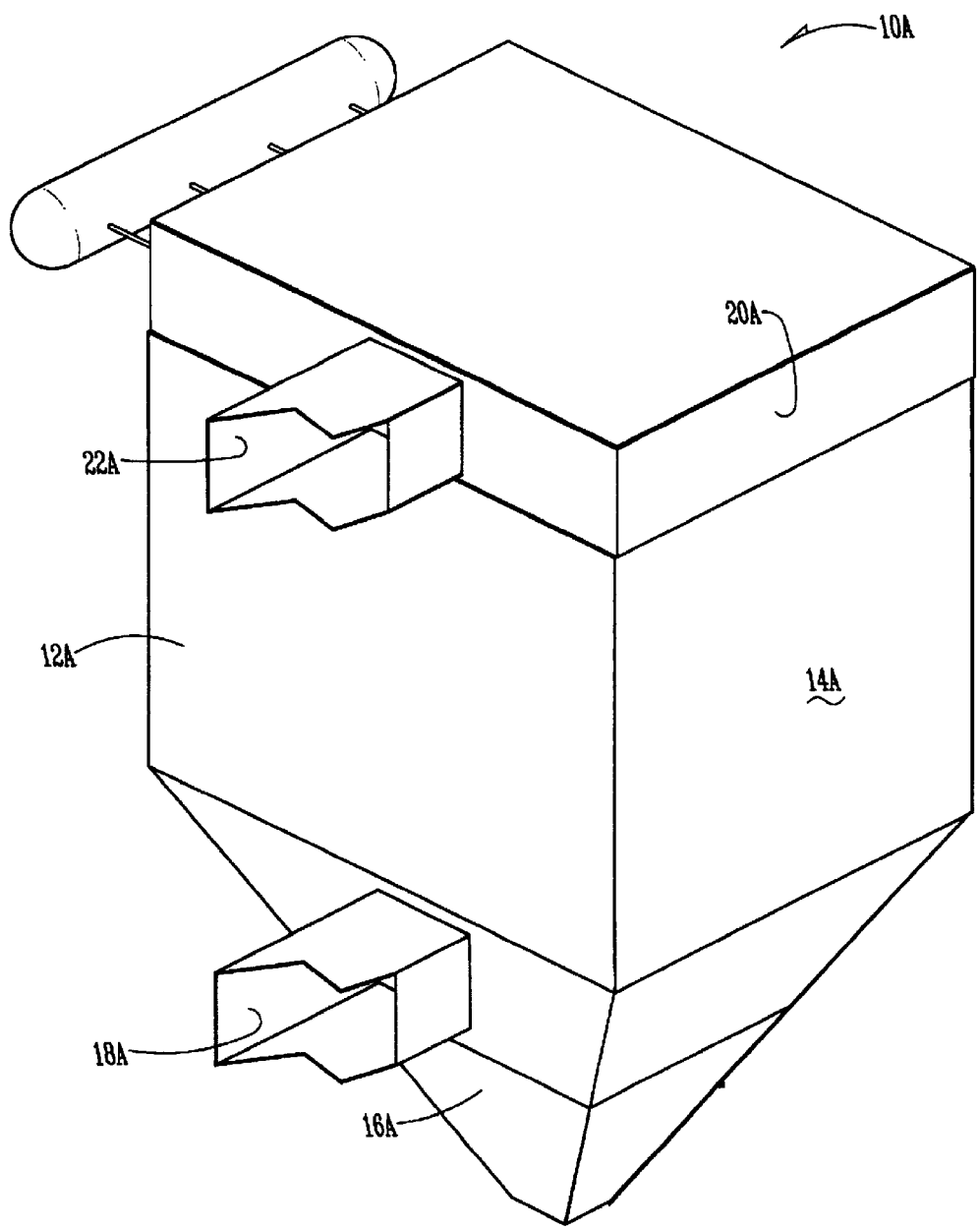
FIG. 9 is a perspective view of a prior art particulate collector.

FIG. 9 shows an alternative embodiment of a particulate collector. FIG. 9 shows an AHPC vessel 10A which is substantially the same as the AHPC vessel 10 shown in FIG. 1 except for the differences illustrated below. In the AHPC vessel 10A, the dirty flue gas is introduced from below the rows of filter bags 24 rather than from the sides. As shown in FIG. 9, a flue gas inlet ducting 18A is located below the chamber of the AHPC vessel 10A so that the dirty flue gas is introduced below the rows of filter bags 24 and ESP zones 32. The flue gas must pass upward into the channels defined by adjacent grounded plates in order to reach the filter bags 24. The outlet ducting 22A and clean gas plenum 20A are the same as that shown in FIG. 1.

Figure 10:
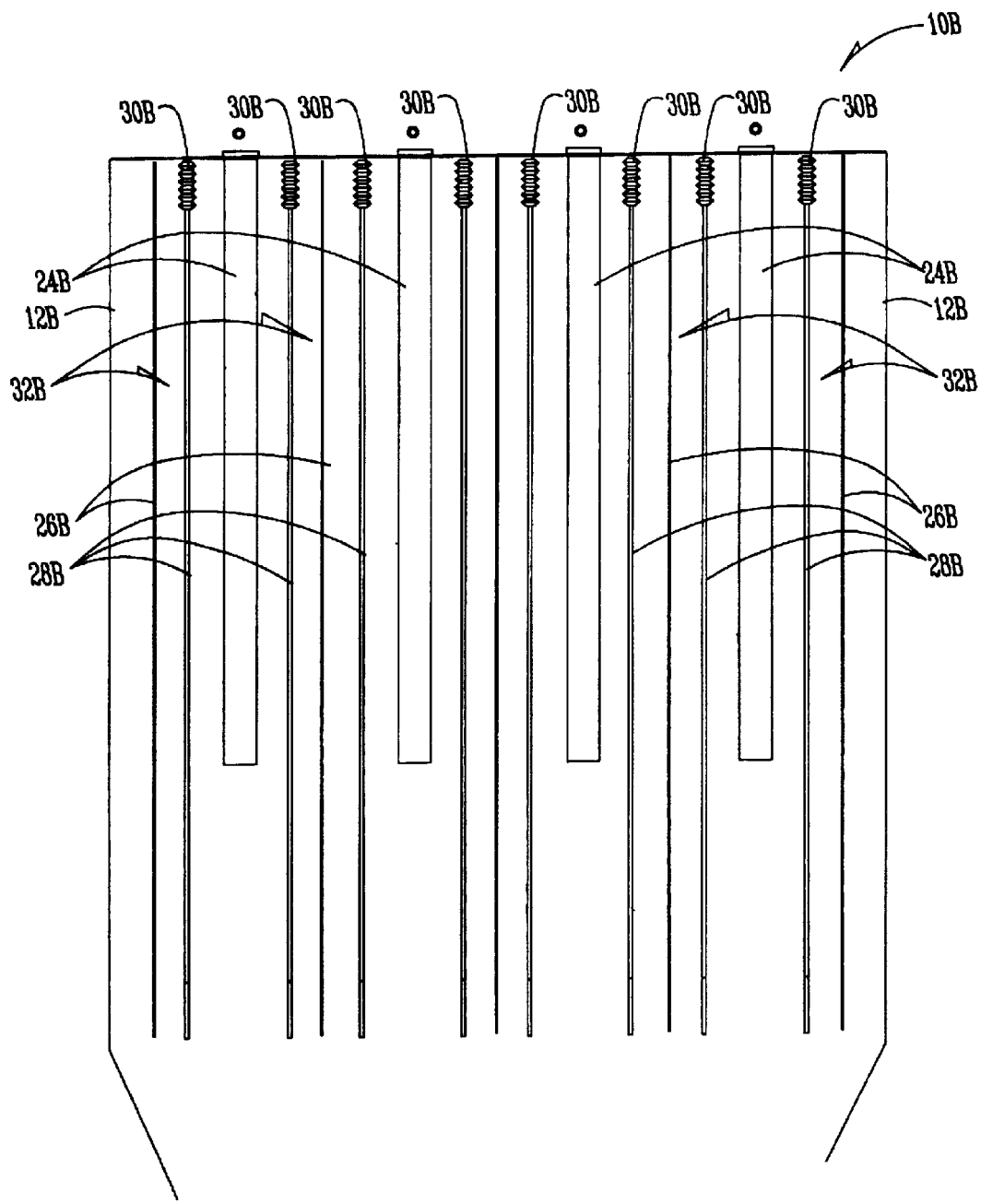
FIG. 10 is a sectional view of a prior art particulate collector.

FIG. 10 shows another form of the particulate collector. FIG. 10 shows an AHPC vessel 10B which is substantially the same as the AHPC vessel 10 as shown in FIG. 1 except that the ESP zones 32B extend downward farther than the bags 24B. The purpose of this embodiment is to capture a larger portion of the dust before it reaches the filter bags 24. This difference is best illustrated by comparing FIG. 10 with FIG. 4.

Figure 11:
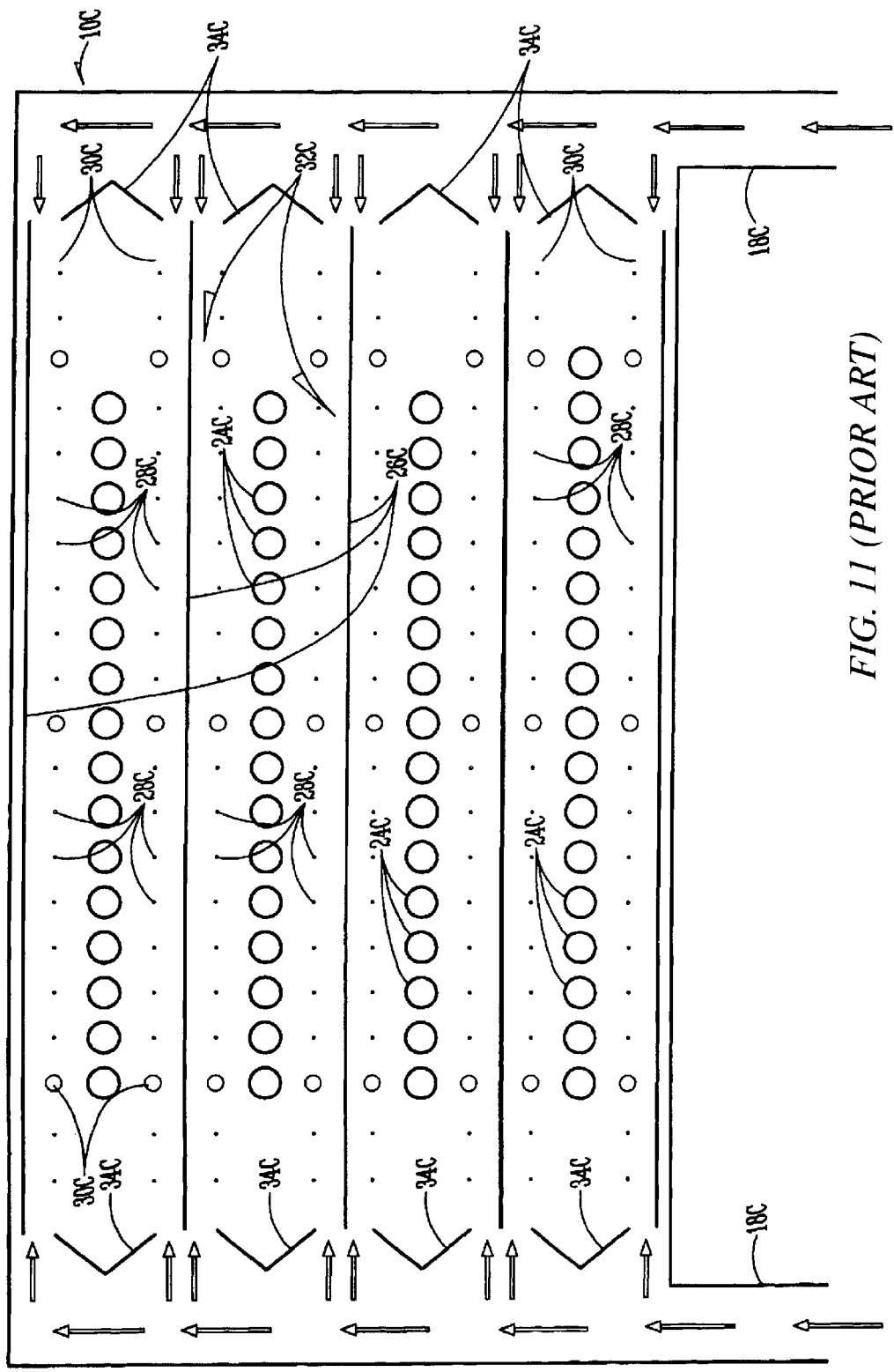
FIG. 11 is a top schematic view of a prior art particulate collector.

FIG. 11 shows another embodiment of the particulate collector. FIG. 11 is a diagram similar to FIG. 5 except that the ESP zones 32C extend horizontally beyond the rows of filter bags 24C. In this way, the gas introduced by the inlet ducting 18C must pass through extend ESP zones 32 before reaching the filter elements or filter bags 24C. With this embodiment, the flue gas must pass through an extended electrostatic zone 32B before it reaches the bag area. The purpose of this embodiment is to ensure the capture of a larger portion of the dust before it reaches the filter bags 24. A difference in this embodiment is illustrated best by comparing FIG. 11 with FIG. 5.

Figure 12:
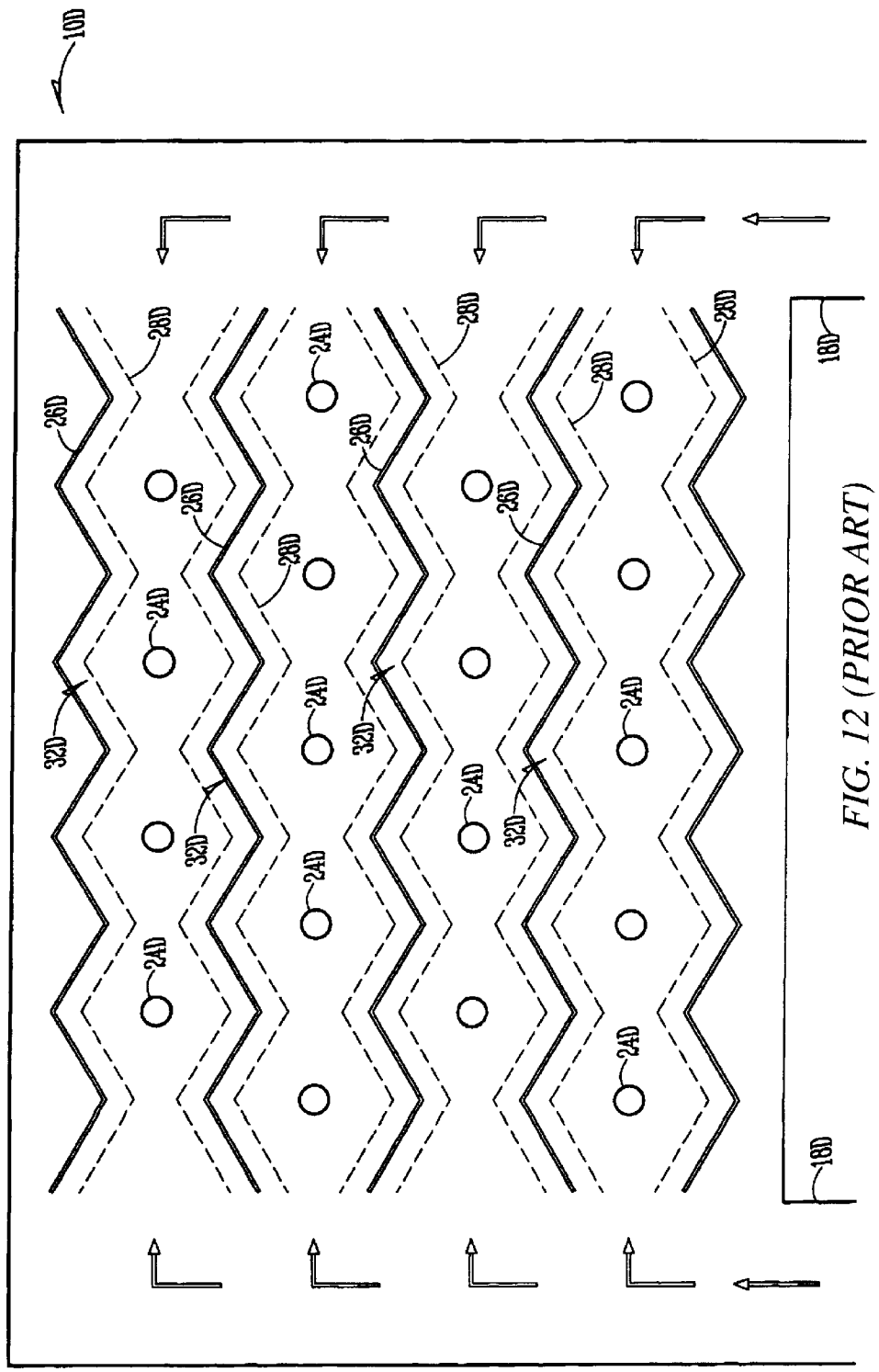
FIG. 12 is a top schematic view of a prior art particulate collector.

FIG. 12 is another embodiment of the particulate collector. The embodiment shown in FIG. 12 is substantially the same as the embodiment shown in FIG. 5 except that the ESP zones 32D form a zigzag pattern. As shown, the grounded plates 26D and electrode grids 28D comprise a plurality of straight segments arranged as shown. Alternatively, the grounded plates 26D and/or electrode grids 28D could be curved or form patterns other than the zigzag pattern show.

For the best results, the filter bags 24 of the particulate collector should be comprised of a sophisticated fabric which can achieve ultra high collection efficiency and can also endure frequent high energy pulsing. In addition, the selected fabric should be reliable under the most severe chemical environment likely to be encountered (for example, high $SO_3$). The filter bags 24 are preferably comprised of Gore-Tex® membrane on Gore-Tex® felt consisting of a microporous expanded polytetrafluoroethylene (PTFE) membrane laminated to a felted or fabric backing material such as that manufactured by W. L. Gore and Associates, Inc. Another alternative filter element comprises the use of a filter cartridge which could be comprised of paper or fabric or some combination thereof. The preferred filter cartridge is comprised of a cartridge known as the Gore-Tex® light pulse filter cartridge manufactured by W. L. Gore and Associates, Inc. In addition, any other suitable paper or fabric filter type may be used. Another alternative filter element is a ceramic gas filter. One example of a suitable ceramic gas filter is manufactured by CeraMem Separations under the name CeraMemn®.

Electrode grid 28 is preferably comprised of high voltage corona discharge electrodes, either in the form of wires or a rigid frame. Preferably, directional corona electrodes are used so that the corona is forced to the plate side of the electrode rather than to the bag side. In addition, any other type of conventional electrode may be employed. In an alternative embodiment, the bags 24 can be protected by including a row of grounded wires located between the electrode grid 28 and the bags 24. However, typically, this extra row of grounded wires is not necessary, except under severe sparking conditions. Another optional embodiment involves the use of multiple vessels for use with large power plants, for example.

There is major synergism between the ESP and filtration modes of the particulate collector, each improving the operation of the other. The filter elements collect the excess ESP emissions during normal operation and during rapping, and the ESP collects the reentrained dust from the filter elements upon cleaning, which will greatly enhance the ability to control pressure drop and operate at high A/C ratios. The particulate collector results in a high collection efficiency and requires a much lower plate collection area than with conventional ESP devices and much less filtration area than in conventional baghouses. In one embodiment, the fabric is operated at an A/C ratio of 12 ft./min. The corresponding required plate area would be a specific collection area (SCA) of 72 square feet of collection are per thousand acfm. A baghouse operating at an A/C ratio of 2 ft./min. has the same collection area as an ESP with an SCA of 500. Therefore, the device operating at an A/C ratio of 12 ft./min. would offer an 83% reduction in fabric area over a conventional baghouse operating at 2 ft./min. and an 86% reduction in plate area over a conventional ESP with an SCA of 500. The combined collection area would be 69% lower than either the conventional baghouse or ESP.

The performance of the particulate collector may also be improved by injecting upstream of the baghouse a small but conditioning effective amount of ammonia gas (NH3) and sulfur trioxide ($SO_3$) in sequence. When this is done, the pressure drop across the baghouse is less and the amount of particulate matter in the smoke stack emissions is reduced by significant amounts. This method is described in detail in U.S. Pat. No. 5,034,030 entitled "Process of Flue Gas Conditioning Applied to Fabric Filtration" issued to Miller et al. on Jul. 23, 1990 which is incorporated by reference herein.

As mentioned above, the present invention improves on the particulate collector disclosed above and in the referenced U.S. Pat. No. 5,938,818. In general, the present invention provides a unique geometry in which perforated grounded collection plates are positioned between rows of filter bags and rows of high voltage electrodes. The collection plates are used as the main collection plates so that the grounded collection plates 26 described above are not required.

Figure 13:
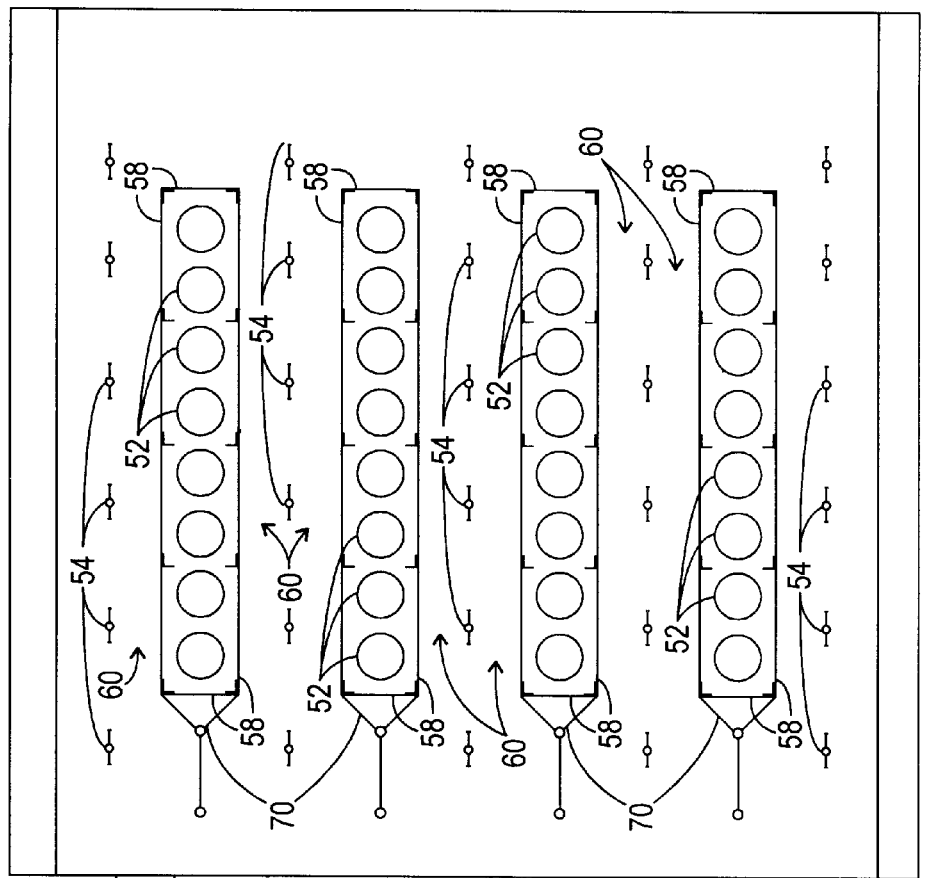
FIG. 13 is a top schematic view of the present invention.
Figure 13:
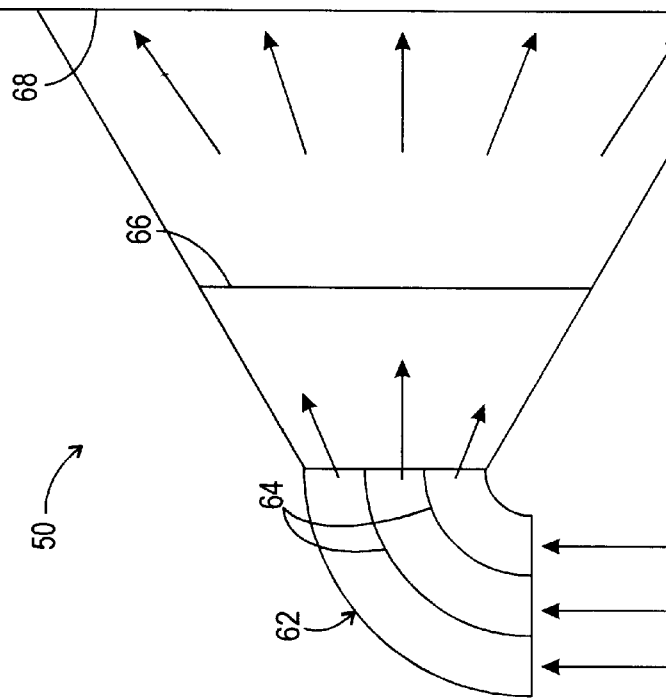
Figure 14:
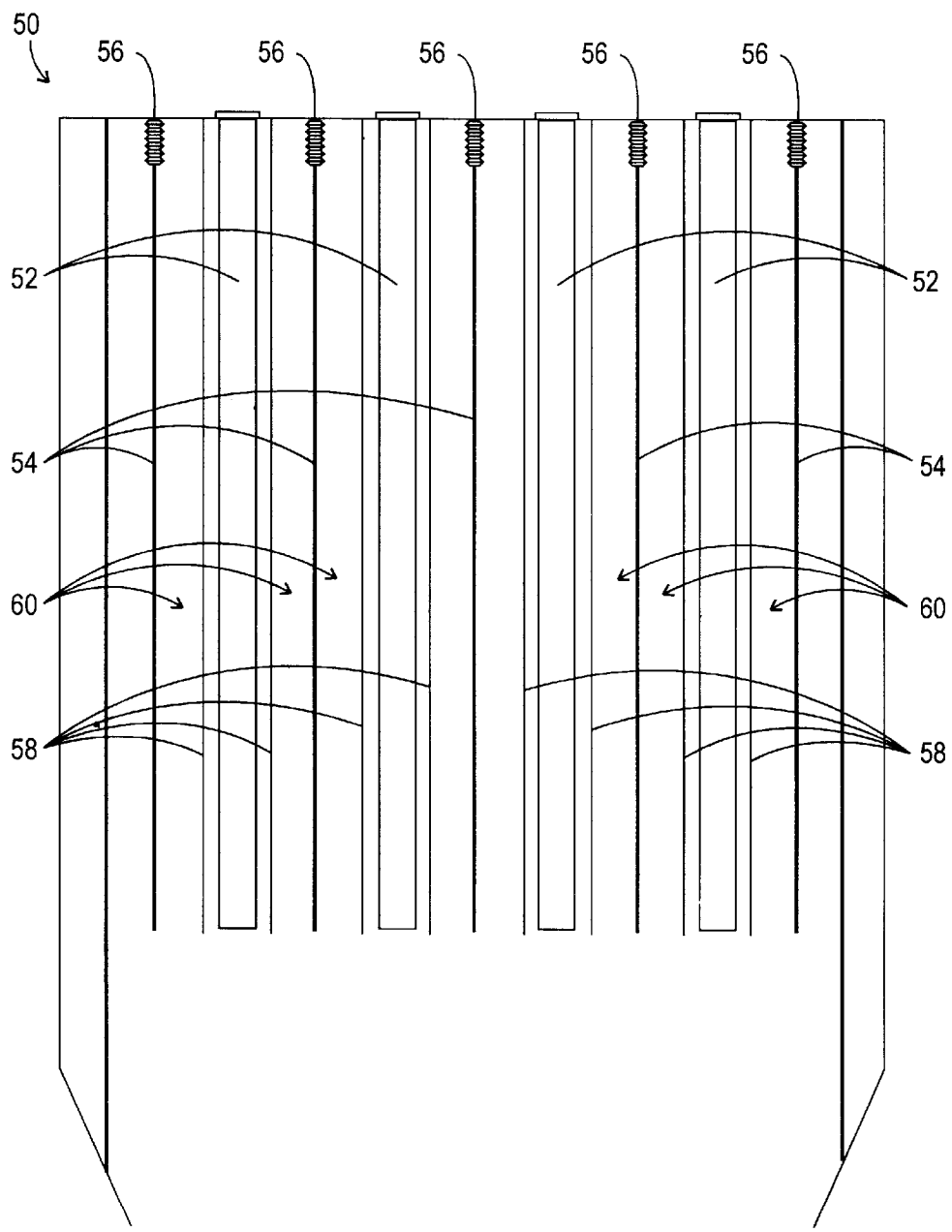
FIG. 14 is a sectional view of the present invention.

FIG. 13 is a top schematic view of an AHPC vessel 50. FIG. 14 is a sectional view of the AHPC vessel 50 shown in FIG. 13. The AHPC vessel 50 shown in the Figures includes a plurality of filter bags 52 arranged in rows within the vessel 50. Like the filter bags 24 described above, the filter bags 52 may be comprised of elongated cylindrical bags disposed around a wire cage (not shown). The upper end of the filter bags 52 are open and are in communication with a clean gas plenum (not shown). The lower end of the filter bags 52 are closed. When gas is introduced into the AHPC vessel 50, the gas flows through the bags 52 into the clean air plenum. In this way, the gas introduced into the AHPC vessel 50 must flow through the filter bags 52 before leaving the AHPC vessel 50. The flow of gases through the AHPC vessel 50 may flow at any desired filtration velocity.

Positioned between each row of filter bags 52 are a plurality of high voltage discharge electrodes 54 arranged in rows. The rows of high voltage electrodes may take on many forms, including a plurality of individual electrodes such as high voltage discharge electrodes 54 (e.g., FIG. 13) or an electrode grid (e.g., FIG. 5), for example. The high voltage discharge electrodes 54 may be comprised of conventional discharge electrodes, as well as directional discharge electrodes. The discharge electrodes 54 are insulated from the AHPC vessel 50 by insulators 56 (FIG. 14). In one example, the discharge electrodes 54 are centered between adjacent rows of filter bags 52. Note that the electrodes 54 may be arranged in any desired manner. For example, the electrodes 54 may be distributed uniformly in the rows (FIG. 13), or in other ways (e.g., distributed non-uniformly). In addition, combinations of different types of electrodes could be used.

As shown in FIGS. 13 and 14, grounded perforated plates 58 are positioned between each of the rows of filter bags 52 and each adjacent row of discharge electrodes 54. In one example, the distance from the filter bags 52 to the perforated plates 58 is in the range of 0.5 to 5 inches and the distance from the perforated plates 58 to the discharge electrodes 54 is 2 to 20 inches, where the distances are measured at the closest distance between the objects). Also, in one example, the distance from the filter bags 52 to the perforated plates 58 is less than the distance from the perforated plates 58 to the discharge electrodes 54. In one example, the filter bags 52 may be held at the same voltage as the perforated plates 58.

The rows of discharge electrodes 54 and perforated plates 58 form a plurality of ESP zones 60 in the AHPC vessel 50 located between the perforated plates 58. Note that, the ESP zones 60 are formed on both sides of the discharge electrodes 54. The ESP zones 60 are also formed on both sides of each row of filter bags 52 between the perforated plates 58 and the rows of discharge electrodes 54. As dust particles are charged, the particles are forced by the electric field in the ESP zones 60 toward the grounded perforated plates 58 and toward the filter bags 52 behind the perforated plates 58. Therefore, when gas passes through the ESP zones 60, particulates in the gas are collected on the grounded perforated plates 58 while the partially cleaned gas passes through the perforated plate 58 to the filter bags 54. The perforated plates 58 serve the dual purpose of protecting the filter bags 52 from electrical damage due to the presence of an electric field produced by the high voltage electrodes 54 as well as forming an electrode for collecting the precipitated dust. Therefore, each of the grounded perforated plates 58 is both a grounded protective grid and a collection plate. There is therefore no need for a separate grounded collection plate. This geometric arrangement has the further advantage that the AHPC vessel can be configured in a much more compact arrangement than prior art vessels.

The ESP zones 60 are formed when a voltage differential is applied to the high voltage discharge electrodes 54 (e.g., a first electrode) and to the perforated plates (e.g., a second electrode). The voltage differential may be thought of as applying a first bias voltage to the first electrode and a second bias voltage to the second electrode. Note that "voltage" is a relative term. Therefore, the voltage differential could be applied in various ways. For example, the first electrode could have either a high or a low bias voltage applied to it, relative to a bias voltage applied to the second electrode.

In one embodiment, additional grounded perforated plates 58 are also placed at each end of each row of filter bags 52 so that the perforated plates 58 enclose each row of filter bags 52 on the sides of each row as well as at the ends of the rows (FIG. 13). The term "enclose" in the previous sentence is intended to mean that the perforated plates 58 surround each row of filter bags 52 on the sides and on the ends. In the example shown in FIGS. 13 and 14, the perforated plates 58 do not enclose the filter bags 52 on the top or bottom, although they may also enclose the filter bags 52 on the bottom in other AHPC vessel designs. Note that the terms "top" and "bottom" are relative and depend on the AHPC vessel design. For example, an AHPC may be designed with horizontal filter bags.

The grounded perforated plates 58 are comprised of plates with one or more openings formed in the plate so that a portion of the plates 58 are open areas. In one embodiment, the grounded perforated plates 58 have an open area equal in the range of 20% to 80%. In one example, the open area of a perforated plate 58 is 50%. Or course, the percentage of open area can vary depending on various factors such as, for example, the specific details of the AHPC vessel 50, particulate characteristics, air flow specifications, field strength, type of filter bags, electrode design, internal component types and spacing, the specific process application, etc.

Figure 15:
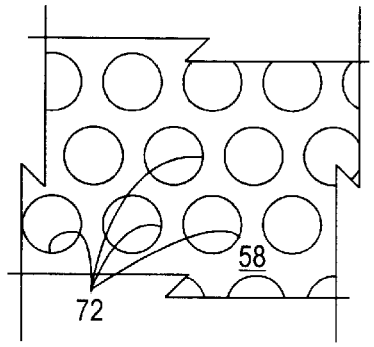
FIGS. 15–20 are partial views of various embodiments of perforated plates.
Figure 16:
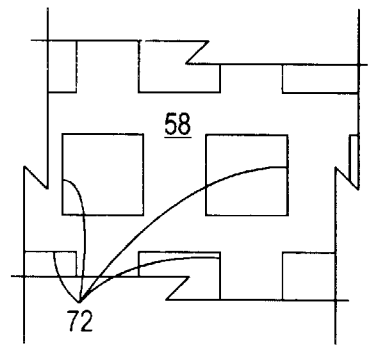
Figure 17:
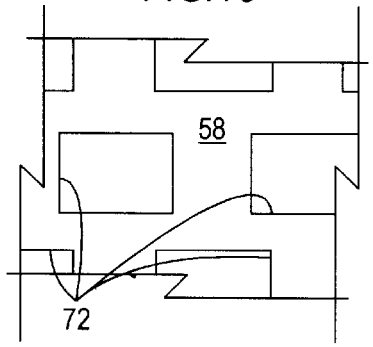
Figure 18:
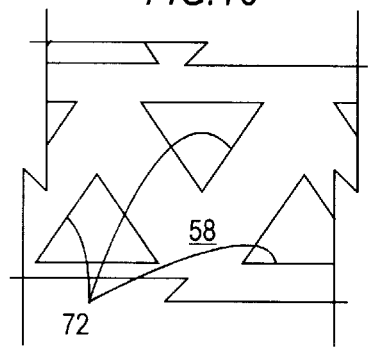
Figure 19:
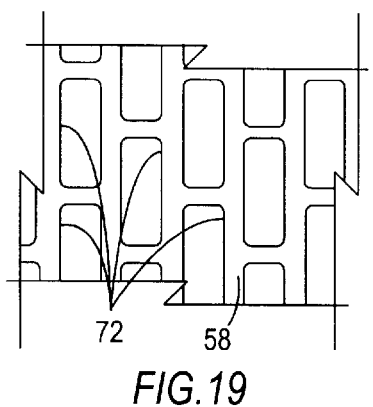
Figure 20:
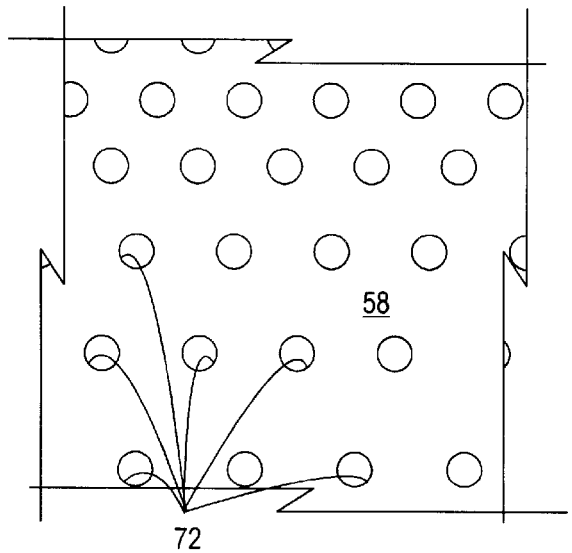

The open area of the perforated plates 58 is formed by a plurality of openings in the plates. FIGS. 15–20 are partial views showing various examples of openings formed in a perforated plate 58. FIG. 15 is an enlarged partial view of a perforated plate 58 with a plurality of round openings 72 formed in the plate. The openings 72 can be sized and spaced as desired. In one example, the openings 72 shown in FIG. 15 have a diameter of 0.5 to 5 inches. FIG. 16 is an enlarged partial view of a perforated plate 58 with a plurality of square openings 72 formed in the plate. FIG. 17 is an enlarged partial view of a perforated plate 58 with a plurality of rectangular openings 72 formed in the plate. FIG. 18 is an enlarged partial view of a perforated plate 58 with a plurality of triangular openings 72 formed in the plate. FIG. 19 is an enlarged partial view of a perforated plate 58 with a plurality of slotted openings 72 formed in the plate. Of course, openings having other shapes can also be used. The openings 72 in the perforated plates 58 shown in FIGS. 15–19 can be made any desired size and can be spaced or distributed on the plates 58 in desired manner. The openings 72 may also be arranged on the plate 58 using any desired geometric arrangement. In addition, shapes other that the examples shown in the figures may be used. If desired, combinations of different shapes may be used on the same perforated plate 58. Also, the distribution of openings on the plates 58 does not have to be uniform. For example, it may be desirable to have a larger percentage of open area in one portion of a plate 58 and a smaller percentage in another portion. FIG. 20 is an enlarged partial view of a perforated plate 58 with a plurality of round openings 72 formed in the plate. The round openings 72 in FIG. 20 are not evenly distributed. As shown, the percentage of open area is larger at the top of FIG. 20 than at the bottom of FIG. 20. The percentage of open area on a plate may vary with vertical position, horizontal position, the position with respect to filter bag placement, etc.

Figure 21:
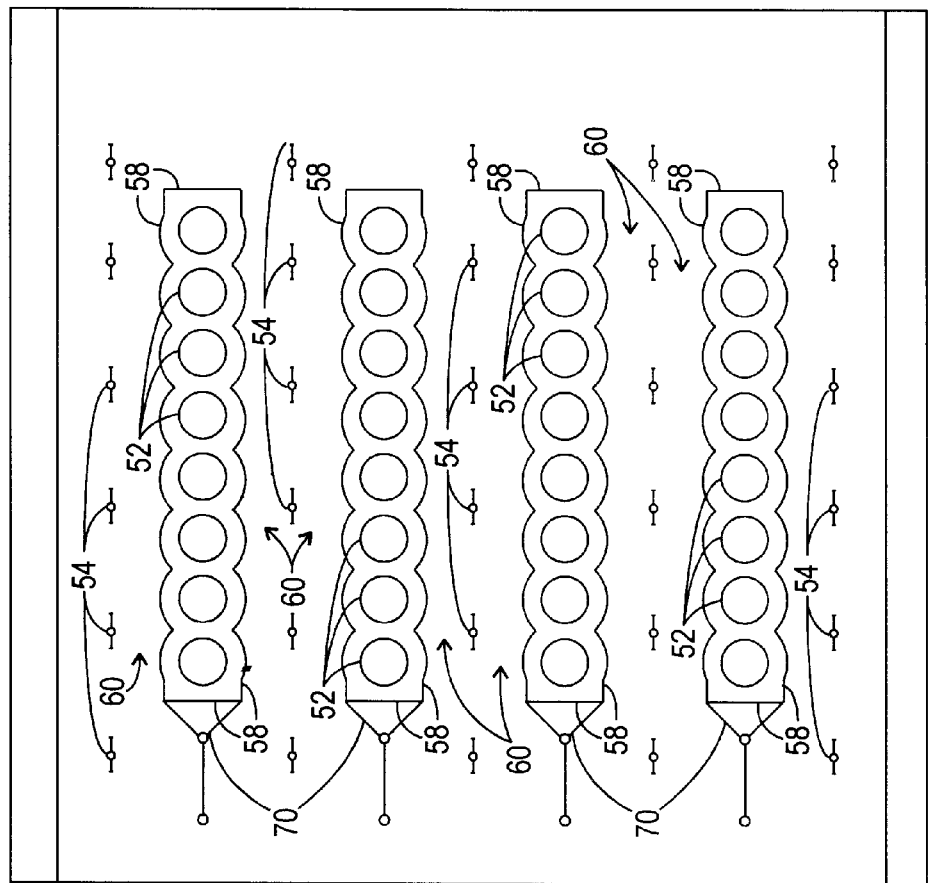
FIG. 21 is a top schematic view of an embodiment of the present invention.
Figure 21:
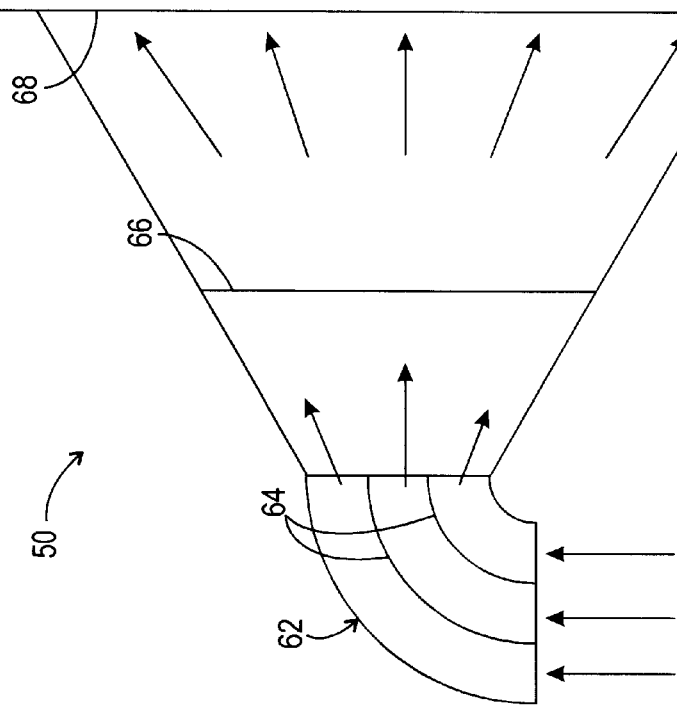

While the perforated plates 58 shown in FIGS. 13 and 14 are shown as being flat, in other examples, the perforated plates 58 may take on other shapes. For example, FIG. 21 shows an AHPC vessel 50 similar to the vessel shown in FIG. 13, but with perforated plates 58 that are contoured to follow the round shape of the filter bags 52. The shape of the perforated plates 58 can be designed in various ways by taking into consideration factors such as the size of the filter bags 52, the spacing of the bags 52, etc. Note that other shapes are also possible (e.g., a zigzag shape, a curved shape, a corrugated shape, etc.). It can be seen that the perforated plates 58 do not have to be perfectly flat, but could take on other shapes while still being generally aligned along a line generally parallel to the filter elements. Other possible embodiments of perforated plates are described below with respect to FIGS. 25–26.

When gas is introduced into the AHPC vessel 50 via inlet duct 62, the gas flows through the bags 52 and into the clean air plenum. The inlet duct 62 includes a plurality of vanes 64 which help to maintain a more uniform flow of gas through the vessel 50. The arrows shown in FIG. 13 illustrate the flow of gas through the vessel 50. As the arrows illustrate, gas flows through the inlet duct 54 and is directed by the vanes 64 into the vessel 50. The vessel 50 includes a first baffle 66 and a second baffle 68 which improves the flow uniformity. Note that the input portion (i.e., inlet duct 62, vanes 64, baffles 66 and 68) of the vessel 50 shown in FIG. 13 illustrates one example and that many other configurations are possible. The gas flows through the first and second baffles 66 and 68 toward the ESP zones 60 formed between the rows of discharge electrodes 54 and the perforated plates 58. FIG. 13 shows optional baffles 70 which help to direct the gas into the ESP zones 60.

The filter bags 52 shown in FIGS. 13 and 14 can be cleaned using pulses of air, similar to the cleaning process described above. The filter bags 52 are pulsed cleaned with sufficient energy and pulse volume so that the dust is removed from the filter bags 52 and is passed through the perforated plates into the ESP zones 60 of the AHPC vessel 50. The reentrained dust that is cleaned off the filter bags 52 is prevented from recollecting on the bags by the perforated plates 58. The bag cleaning pulse could occur simultaneously with the plate rapping to prevent dust released from the perforated plates due to the plate rapping from collecting on the filter bags 52.

Figure 22:
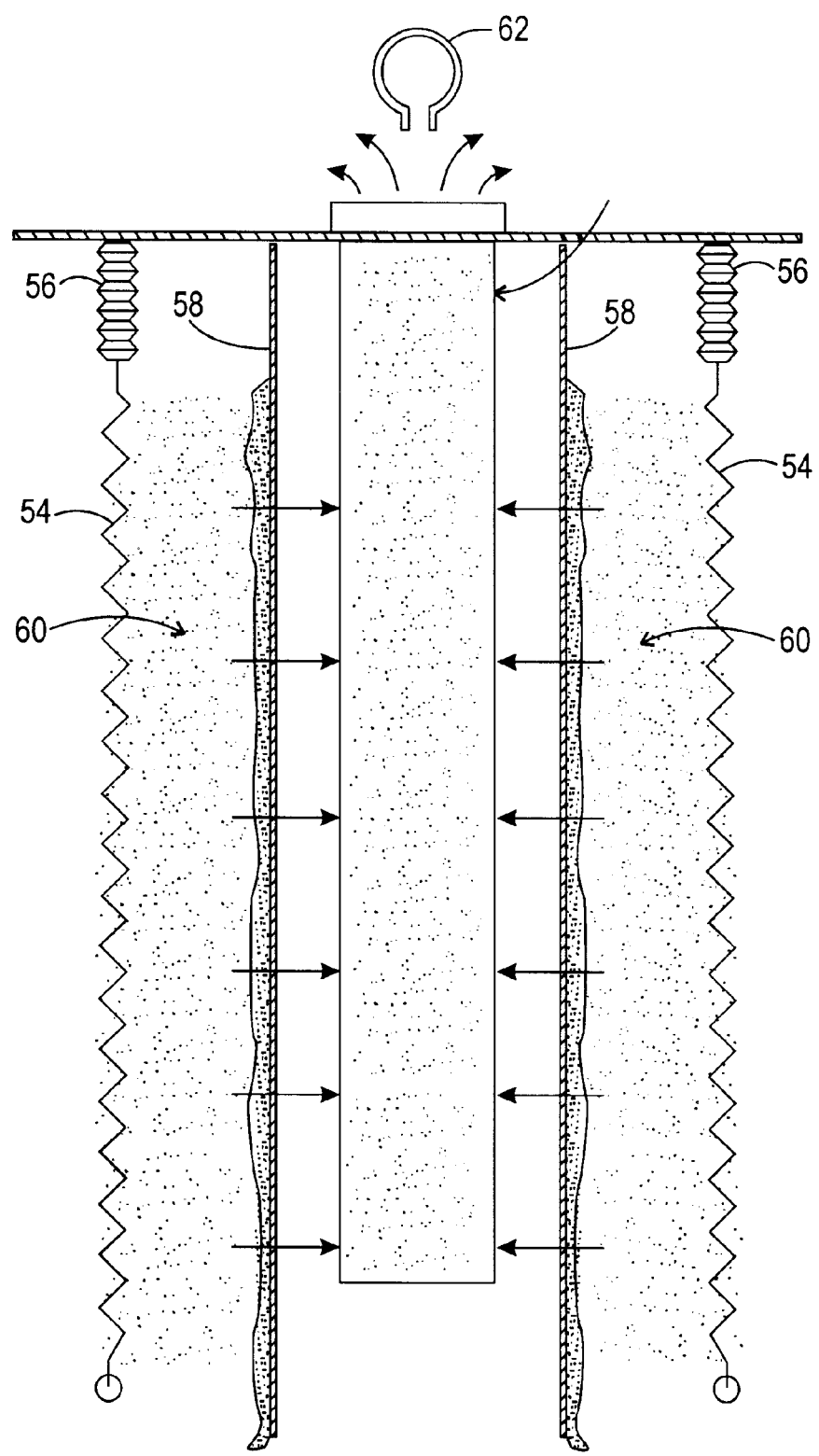
FIGS. 22–24 are sectional views illustrating the operation of the present invention.

FIG. 22 shows the normal particulate collection mode of the particulate collector of the present invention. As was mentioned above, gas is introduced into the AHPC vessel 50 and flows into the ESP zones 60, which are located between the electrodes 54 and the perforated plates 58. As a result of the corona discharge and the electric field produced by the electrodes 54 and the perforated plates 58, the particulates in the ESP zone immediately become charged and migrate toward the plates 58 at a velocity (migration velocity) dependent upon the particle charge and the electric field strength. As shown, the particulates collect on the perforated plates 58, while the gas passes through the perforated plates 58 to the filter bags 52 (illustrated by the arrows in FIG. 22). The filter bags 52 collect the particulates that are not collected in the ESP zones 60. After flowing through the filter bags 52, the gas flows upward into the clean air plenum as (illustrated by the arrows in FIG. 22). As a result, the gas entering the clean air plenum is very clean.

Figure 23:
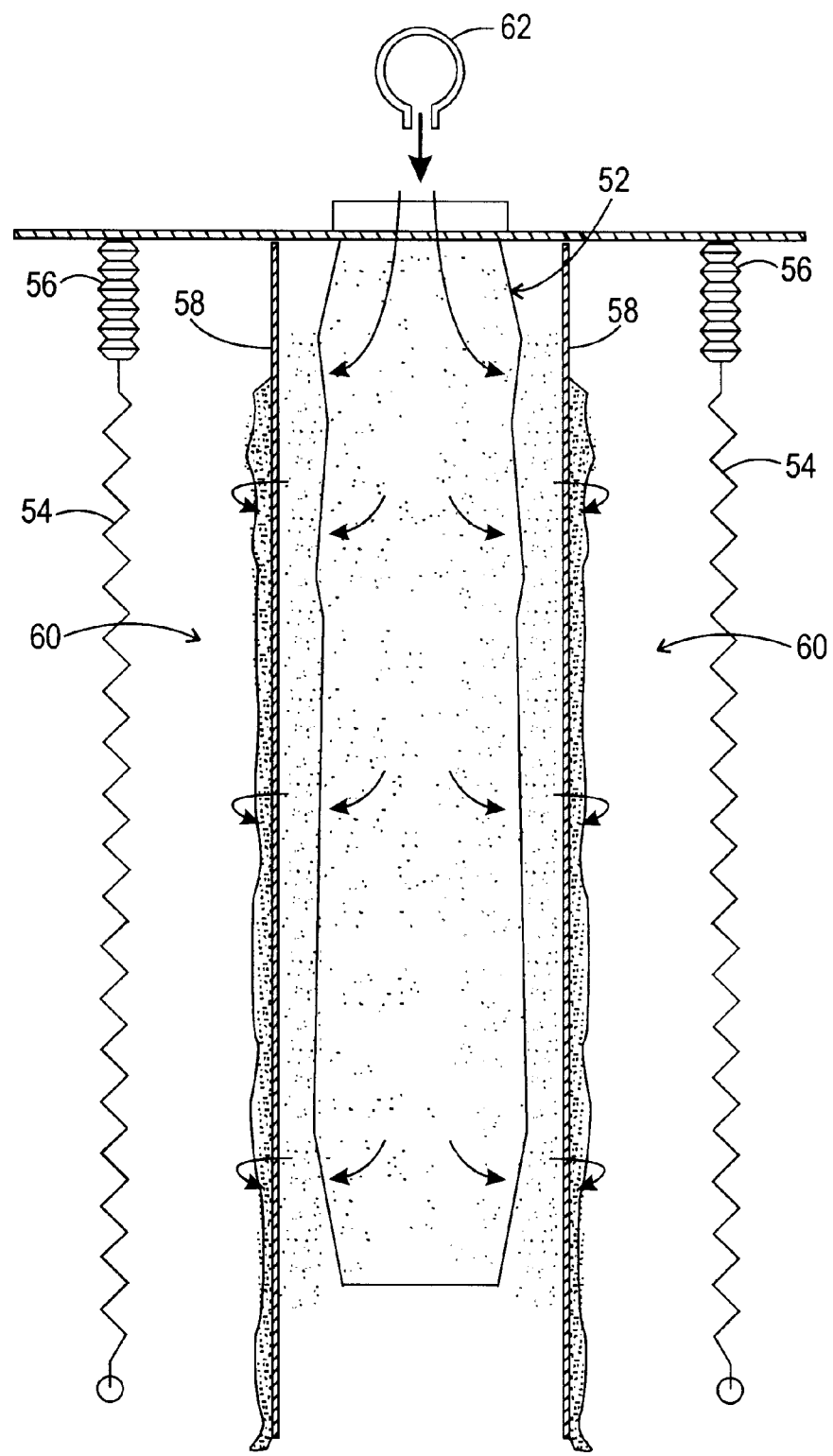

FIG. 23 illustrates the bag cleaning process. Since the particulates accumulate on the perforated plates 58 and filter bags 52, the particulates must be periodically removed from the plates 58 and the filter bags 52. Located above each filter bag 52 is a pulse nozzle 62 which is capable of directing a pulse of air down through the filter bags 52. The bags 52 are cleaned with a reverse pulse of pressurized air or gas from the pulse nozzles 62. The pulses have sufficient energy to dislodge most of the particulates from the bags 52. Larger agglomerates fall to the hopper. However, much of the particulates are reentrained into particles too small to fall directly to the hopper. The bags 52 are pulsed with sufficient energy and volume to propel the reentrained particulates through the perforated plates 58 back into the ESP zones 60 where they immediately become charged and are trapped on the plates 58. Since these reentrained particulates are much larger than those originally collected on the bags, they are trapped in the ESP zones 60 more easily than the original fine particulates.

The particulate collector may utilize a two-tiered cleaning pulse. A first, high-pressure short-duration pulse is followed by a second, lower-pressure longer duration pulse, such as is described above. Of course, the particulate collector may use a single pulse, or more than two pulses.

Figure 24:
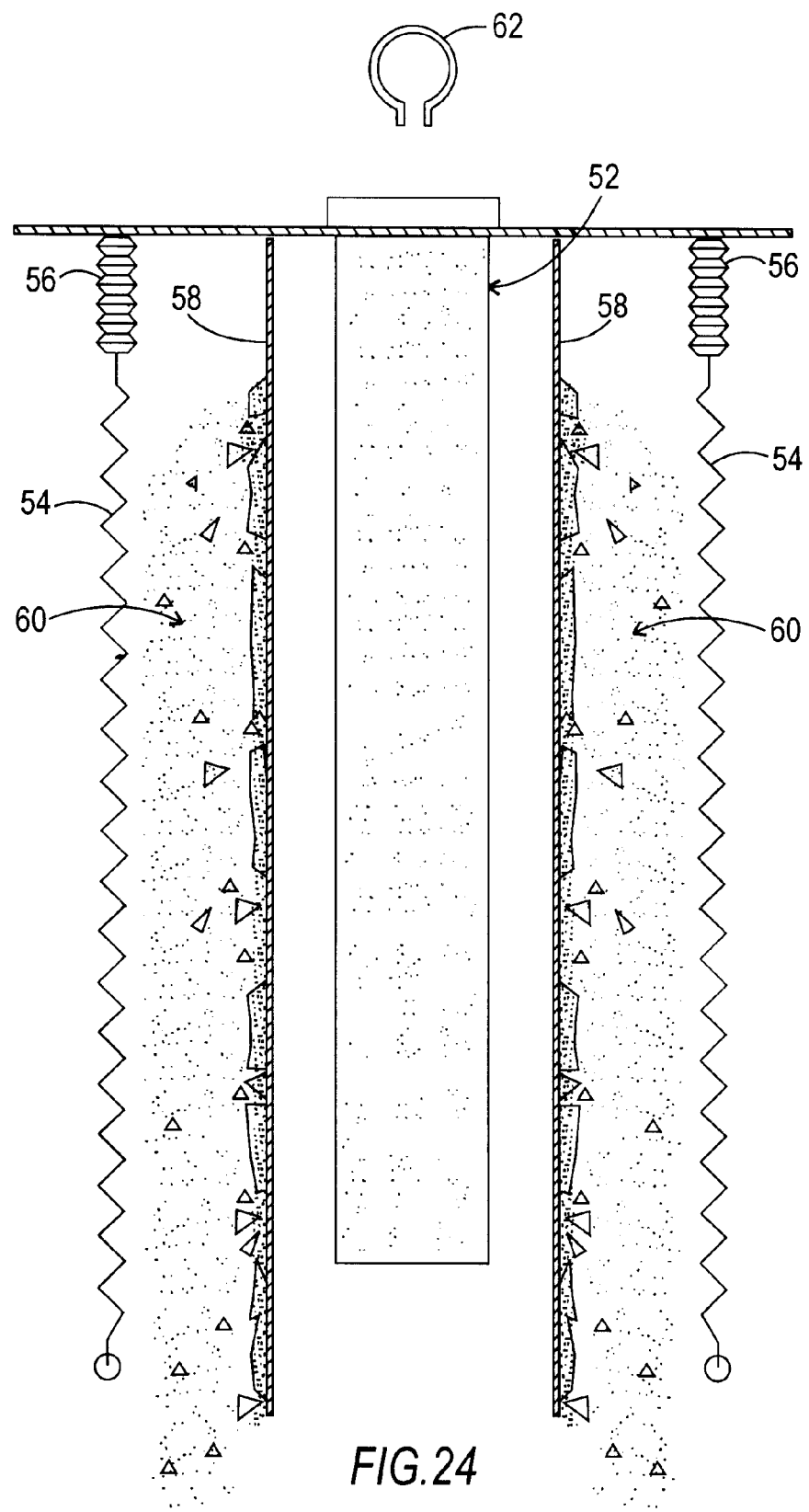

Periodically, the collections of particulates on the perforated plates 58 must be cleaned from the plates 58. FIG. 24 illustrates a plate rapping process which removes the particulates from the perforated plates 58. With the voltage differential removed from the electrodes 54 and plates 58, the perforated plates 58 are rapped or vibrated to dislodge large agglomerates which then fall in the hopper. A fraction of the particulates are reentrained as particles too small to reach the hopper. Most of the reentrained particles are recollected on the plates 58. Any remaining fine dust, reentrained as a result of rapping, that penetrates the ESP Zones 60 will be collected at an ultrahigh collection efficiency by the filter bags 52. Plate cleaning may also be accomplished without disconnecting the high voltage. Also, the plate rapping process (FIG. 24) may take place at approximately the same time as the pulsing of the filter bags 52 (FIG. 23).

Other embodiments of the present invention may be realized. For example, the ESP zones 60 may extend downward farther than the filter bags 52, similar to the embodiment shown in FIG. 10. Also, the ESP zones 60 may extend horizontally beyond the rows of filter bags 52, similar to the embodiment shown in FIG. 11. 771 The filter bags 52 may be comprised of any suitable material, including a Gore-Tex® membrane on Gore-Tex® felt, such as that described above. In addition, the filter bags 52 may be comprised of conductive filter bags made from a conductive material.

Figure 25:
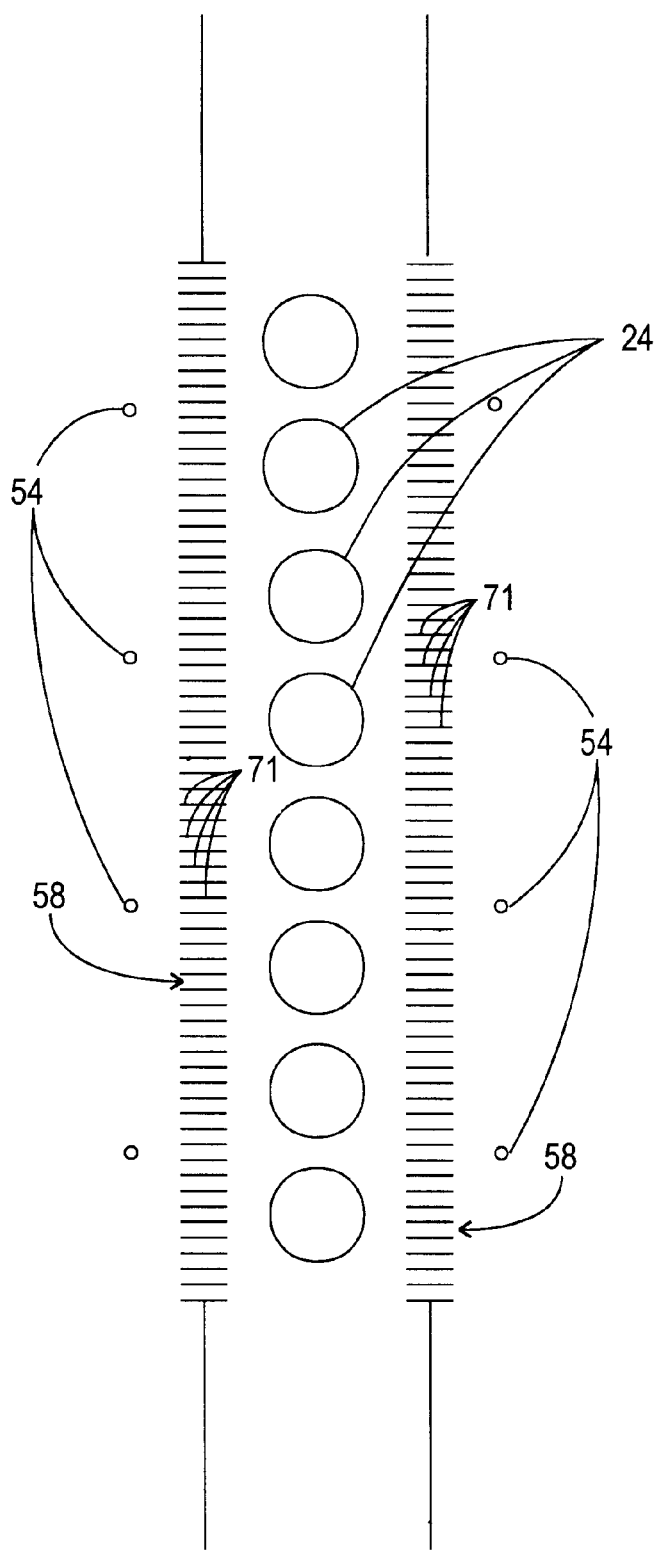
FIGS. 25–26 show embodiments of possible perforated plates of the present invention.
Figure 26:
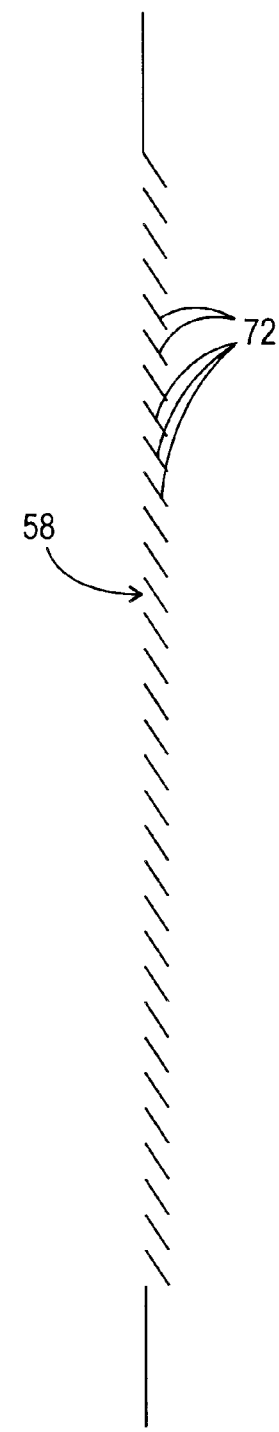

As mentioned above, the perforated plates 58 may be designed in many ways. FIGS. 25 and 26 show other possible embodiments of perforated plates 58. FIG. 25 is an enlarged top view of a row of filter bags 52 and rows of electrodes 54. A perforated plate 58 is provided with a plurality of fins 71. The fins 71 provide a larger surface area for particulates to collect on, as opposed to a perforated plate having only a plurality of openings. FIG. 26 is an enlarged side view of a perforated plate 58 provided with a plurality of louvers 72. The louvers 72 also provide more surface area for particulates to collect on and help to cause particulates to fall into the ESP zone. The fins 71 and louvers 72 can be designed to help direct air flow in a desired direction. In addition, the fins 71 or louvers 72 can be designed to be adjustable. The fins 71 and louvers 72 also help to provide protection to the filter bags 52 against electrical damage. In one example, the fins 71 are approximately 0.5–3 inches wide and spaced apart from each other by approximately 0.5–3 inches. In one example, the louvers 72 are approximately 0.5–5 inches wide, spaced apart from each other by approximately 0.5–3 inches, and disposed at an angle of approximately 10–80 degrees from vertical.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A filtration and electrostatic precipitation device for the collection of particulates comprising:

a housing, a plurality of rows of filter elements disposed within the housing;

a plurality of rows of electrodes disposed between adjacent rows of filter elements; and a plurality of grounded perforated collection plates disposed between adjacent rows of filter elements and electrodes to form electrostatic collections areas between the rows of electrodes and collections plates.

2. The filtration and electrostatic precipitation device of claim 1, wherein the collection plates surround the rows of filter elements.

3. The filtration and electrostatic precipitation device of claim 1, wherein each of the plurality of rows of electrodes is comprised of a plurality of discharge electrodes.

4. The filtration and electrostatic precipitation device of claim 1, wherein each of the plurality of rows of electrodes is comprised of a plurality of directional discharge electrodes.

5. The filtration and electrostatic precipitation device of claim 1, wherein each of the plurality of rows of electrodes is comprised of an electrode grid.

6. The filtration and electrostatic precipitation device of claim 1 wherein the distance between each of the rows of teletrodes and adjacent perforated plates is greater than the distance between each of the perforated plate and adjacent rows of filter elements.

7. The filtration and electrostatic precipitation device of claim 1, wherein the distance between each of the rows of electrodes and adjacent perforated plates is in the range of 2 to 20 inches and the distance between each of the perforated plates and adjacent rows of filter elements is in the range of 0.5 to 5 inches.

8. The filtration and electrostatic precipitation device of claim 1, wherein the plurality of grounded perforated plates are separated from the adjacent rows of filter elements.

9. The filtration and electrostatic precipitation device of claim 1, wherein the electrodes in each row of electrodes are distributed uniformly in the row.

10. The filtration and electrostatic precipitation device of claim 1, wherein the electrodes in each row of electrodes are not distributed uniformly in the row.

11. The filtration and electrostatic precipitation device of claim 1, wherein different types electrodes are used within each row of electrodes.

12. The filtration and electrostatic precipitation device of claim 1, wherein rows of electrodes and perforated collection plates extend downward farther than the rows of filter elements.

13. The filtration and electrostatic precipitation device of claim 1, wherein rows of electrodes and perforated collection plates extend farther than the rows of filter elements.

14. A method of creating an electrostatic collection area in an electrostatic precipitation device comprising the steps of:
providing a first row of filter elements;
providing a second row of filter elements disposed generally parallel to the first row of filter elements;
providing a first row of electrodes disposed between the first and second rows of filter elements;
providing a first perforated plate between the first row of filter elements and the first row of electrodes;
providing a second perforated plate between the second row of filter elements and the first row of electrodes; and
applying a voltage differential between the electrodes in the first row of electrodes and the first and second perforated plates to form an electrostatic collection area between the first and second perforated plates.

15. The method of claim 14, further comprising the steps of,
providing a third row of filter elements disposed generally parallel to the first row of filter elements;
providing a second row of electrodes disposed between the first and third rows of filter elements; and
providing a third perforated plate between the first row of filter elements and the second row of electrodes.

16. The method of claim 15, further comprising the step of providing fourth and fifth perforated plates positioned at adjacent ends of the first and third perforated plates so that the first row of filter elements is enclosed by the first, second, fourth, and fifth perforated plates.

17. The method of claim 14, wherein the percentage of open area on the perforated plates varies on the perforated plates.

18. The method of claim 14, wherein the first and second perforated plates are comprised of sheets having openings formed in the sheets.

19. The method of claim 18, wherein the openings have an approximate diameter between 0.5 inches to 5 inches.

20. The method of claim 18, wherein at least some of the openings have a round shape.

21. The method of claim 18, wherein at least some of the openings have a rectangular shape.

22. The method of claim 18, wherein at least some of the openings have a triangular shape.

23. The method of claim 18, wherein at least some of the openings have a diamond shape.

24. The method of claim 18, wherein at least some of the openings have a slotted shape.

25. The method of claim 18, wherein the openings are comprised of a combination of openings having different shapes.

26. The method of claim 25, wherein the combination of openings include shapes selected from at least two of round, rectangular, triangular, diamond and slotted.

27. The method of claim 14, wherein at least some, of the perforated plates are generally aligned along a line parallel to the filter elements.

28. The method of claim 14, wherein the perforated plates are contoured around the shape of the filter elements.

29. The method of claim 14, wherein the perforated plates are louvered.

30. The method of claim 14, wherein the perforated plates include a plurality of fins.

31. The method of claim 14, wherein the first row of electrodes is comprised of a plurality of discharge electrodes.

32. The method of claim 31, wherein the discharge electrodes are directional discharge electrodes.

33. The method of claim 31, wherein different types of discharge electrodes are used within each row of electrodes.

34. The method of claim 14, wherein the first row of eletrodes is comprised of an electrode grid.

35. The method of claim 14, wherein the distance between the fist row of electrodes and the first perforated plate is greater than the distance between the first perforated plate and the first row of filter elements.

36. The method of claim 35, wherein the distance between the first row of electrodes and the first perforated plate is in the range of 2 to 20 inches and the distance between the first perforated plate and the first row of filter element, is in the range of 0.5 to 5 inches.

37. The method of claim 14, wherein the plurality of perforated plates are separated from adjacent rows of filter elements.

38. The method of claim 14, further comprising the step of cleaning filter elements by directing a pulse of air inside the filter elements.

39. The method of claim 38, wherein the air directed inside the filter elements is pulsed with sufficient pulse energy and volume to propel particulates past the perforated plates.

40. A filtration and electrostatic precipitation device for the collection of particulates comprising:

a row of filter elements;

a row of electrodes; and a conductive perforated plate disposed between the row of filter elements and the row of electrodes, wherein a voltage differential is applied between the row of electrodes and the perforated plate.

41. The filtration and electrostatic precipitation device of claim 40, wherein the perforated plate is separated from the row of filter elements.

42. The filtration and electrostatic precipitation device of claim 40, wherein the voltage differential is applied by grounding the perforated plate and applying a voltage to the one or more electrodes.

43. The filtration and electrostatic precipitation device of claim 40, wherein the perforated plate is flat.

44. The filtration and electrostatic precipitation device of claim 40, wherein the perforated plate is contoured to match the contour of the row of filter elements.

45. The filtration and electrostatic precipitation device of claim 40, wherein the perforated plate is louvered.

46. The filtration and electrostatic precipitation device of claim 40, wherein the perforated plate includes a plurality of fins.

47. The filtration and electrostatic precipitation device of claim 40, wherein the distance between the one or more electrodes and the perforated plate is greater than the distance between the perforated plate and the row of filter elements.

48. A method of creating an electrostatic collection area and protecting filter elements in a particulate collection device comprising the steps of:

providing one or more filter elements;

providing one or more electrodes; providing an electrically conductive perforated plate; applying a voltage differential between the one or more electrodes and the perforated plate to create an electrostatic precipitation zone; and protecting the one or more filter elements from electrical damage by at least partially surrounding the one or more filter elements by the perforated plate.

49. The method of claim 48, wherein the voltage differential is applied by grounding the perforated plate and supplying a voltage to the one or more electrodes.

50. The method of claim 49, wherein the voltage applied to the one or more electrodes is a positive voltage.

51. The method of claim 49, wherein the voltage applied to one or more electrodes is a negative voltage.

52. The method of claim 48, wherein the voltage differential is applied by applying a first voltage to the perforated plate and applying a second voltage to the one or more electrodes.

53. The method of claim 52, wherein the first voltage is greater than the second voltage.

54. The method of claim 52, wherein the second voltage is greater than the first voltage.

* * * * *